(12) United States Patent
Kameyama et al.

(10) Patent No.: US 10,473,359 B2
(45) Date of Patent: Nov. 12, 2019

(54) FAN AND WATER HEATER PROVIDED WITH THE SAME, AND IMPELLER AND WATER HEATER PROVIDED WITH THE SAME

(71) Applicant: NORITZ CORPORATION, Hyogo (JP)

(72) Inventors: Shuji Kameyama, Himeji (JP); Keigo Fukunishi, Akashi (JP); Mitsuo Nomura, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 86 days.

(21) Appl. No.: 15/897,730

(22) Filed: Feb. 15, 2018

(65) Prior Publication Data
US 2018/0180324 A1   Jun. 28, 2018

Related U.S. Application Data

(62) Division of application No. 14/619,644, filed on Feb. 11, 2015, now Pat. No. 9,933,185.

(30) Foreign Application Priority Data

Feb. 24, 2014   (JP) .................................. 2014-033186
Jul. 25, 2014   (JP) .................................. 2014-151958
Aug. 25, 2014   (JP) .................................. 2014-170314

(51) Int. Cl.
  *F04D 29/02*   (2006.01)
  *F04D 29/28*   (2006.01)
  (Continued)

(52) U.S. Cl.
  CPC .............. *F24H 8/00* (2013.01); *F04D 29/023* (2013.01); *F04D 29/281* (2013.01); *F04D 29/30* (2013.01);
  (Continued)

(58) Field of Classification Search
  CPC ...... F04D 29/023; F04D 29/281; F04D 29/30; F24H 8/00; F24H 9/2042; F23L 17/005;
  (Continued)

(56) References Cited

U.S. PATENT DOCUMENTS

| 5,538,395 A |   | 7/1996 | Hager |  |
|---|---|---|---|---|
| 5,775,878 A | * | 7/1998 | Maumus | ................... F01D 5/04 416/186 R |

(Continued)

FOREIGN PATENT DOCUMENTS

| EP | 1479917 A1 | 11/2004 |
| JP | 54-131106 U | 3/1978 |

(Continued)

OTHER PUBLICATIONS

An Office Action issued by the Japanese Patent Office dated Oct. 27, 2015, which corresponds to Japanese Patent Application No. 2014-033186 and is related to U.S. Appl. No. 14/619,644; with English language partial translation.

(Continued)

*Primary Examiner* — Igor Kershteyn
(74) *Attorney, Agent, or Firm* — Studebaker & Brackett PC

(57) ABSTRACT

A fan includes: an impeller including a main plate having a first plane, a plurality of first blades each formed the first plane, and a shroud formed integrally with the plurality of first blades; a fan case; a drive source; and a rotation shaft. The first blades each include a linearly protruding region that is linearly increased in height from an outer circumferential side to an inner circumferential side, and a curvedly protruding region that is curvedly increased in height from the outer circumferential side to the inner circumferential side, the height extending in a direction in which each first blade protrudes. The linearly protruding region is welded to (Continued)

the main plate. Accordingly, a highly durable fan can be implemented that allows sufficient durability to be maintained even under a high temperature environment or an acid environment.

7 Claims, 32 Drawing Sheets

(51) Int. Cl.
  *F04D 29/30* (2006.01)
  *F24H 8/00* (2006.01)
  *F23L 17/00* (2006.01)
  *F24H 9/20* (2006.01)
(52) U.S. Cl.
  CPC .......... *F23L 17/005* (2013.01); *F24H 9/2042* (2013.01); *F05D 2230/232* (2013.01); *F05D 2300/43* (2013.01); *Y02B 30/102* (2013.01)
(58) Field of Classification Search
  CPC ........... F05D 2230/232; F05D 2300/43; Y02B 30/102
  See application file for complete search history.

(56) References Cited

U.S. PATENT DOCUMENTS

| | | | |
|---|---|---|---|
| 6,592,329 B1 * | 7/2003 | Hirose | F04D 29/023 416/203 |
| 6,805,531 B2 * | 10/2004 | Iida | B29C 45/0062 415/206 |
| 8,435,005 B2 * | 5/2013 | Watanabe | B23K 1/0018 29/889 |
| 8,793,872 B2 * | 8/2014 | Adachi | B29C 65/08 264/239 |
| 8,998,581 B2 * | 4/2015 | Giovannetti | F04D 29/023 416/180 |
| 2008/0279682 A1 | 11/2008 | Wydra | |

FOREIGN PATENT DOCUMENTS

| | | | |
|---|---|---|---|
| JP | 53-54301 | A | 5/1978 |
| JP | S60-186617 | A | 9/1985 |
| JP | 62-243998 | A | 10/1987 |
| JP | 2-132820 | U | 11/1990 |
| JP | H04-40191 | U | 4/1992 |
| JP | 6-278163 | A | 10/1994 |
| JP | 7-127597 | A | 5/1995 |
| JP | 11-294861 | A | 10/1999 |
| JP | 11-319529 | A | 11/1999 |
| JP | 2000-356197 | A | 12/2000 |
| JP | 2001-165091 | A | 6/2001 |
| JP | 2002-317792 | A | 10/2002 |
| JP | 2003-343484 | A | 12/2003 |
| JP | 2004-027892 | A | 1/2004 |
| JP | 2005-23897 | A | 1/2005 |
| JP | 3111526 | U | 7/2005 |
| JP | 2009-091935 | A | 4/2009 |
| JP | 2010-242543 | A | 10/2010 |
| JP | 2010-281256 | A | 12/2010 |
| JP | 2011-178027 | A | 9/2011 |
| JP | 2012-140884 | A | 7/2012 |

OTHER PUBLICATIONS

An Office Action issued by the Japanese Patent Office dated Oct. 27, 2015, which corresponds to Japanese Patent Application No. 2014-151958 and is related to U.S. Appl. No. 14/619,644; with English language partial translation.

An Office Action issued by the Japanese Patent Office dated Oct. 27, 2015, which corresponds to Japanese Patent Application No. 2014-170314 and is related to U.S. Appl. No. 14/619,644; with English language partial translation.

* cited by examiner

FAN AND WATER HEATER PROVIDED WITH THE SAME, AND IMPELLER AND WATER HEATER PROVIDED WITH THE SAME

CROSS-REFERENCE TO RELATED APPLICATIONS

This application is a Divisional of U.S. patent application Ser. No. 14/619,644 filed Feb. 11, 2015, which claims priority to and the benefit of Japanese Patent Application No. 2014-033186 filed Feb. 24, 2014, Japanese Patent Application No. 2014-151958 filed Jul. 25, 2014, and Japanese Patent Application No. 2014-170314 filed Aug. 25, 2014, the entire contents of which are incorporated herein by reference.

BACKGROUND OF THE INVENTION

Field of the Invention

The present invention relates to a fan and a water heater provided with the fan, and an impeller and a water heater provided with the impeller.

Description of the Background Art

In replacement of an already placed tank water heater with an instantaneous water heater, there are locations where an already placed exhaust pipe (a B vent) cannot be removed from a point of view of maintaining appearance of buildings.

At such a location, a water heater can be replaced by leaving the already placed exhaust pipe and inserting an exhaust tube (a flexible exhaust tube) in the exhaust pipe. The exhaust tube should be smaller in diameter, because the exhaust tube cannot be placed in the exhaust pipe if the exhaust tube has a large outer diameter. In order to maintain a stable combustion state even when the exhaust tube is decreased in diameter, an exhaust suction and combustion type should be adopted for a water heater.

A water heater of this exhaust suction and combustion type is disclosed, for example, in Japanese Patent Laying-Open No. 60-186617. In the water heater described in this publication, a heat exchanger for recovering sensible heat, a heat exchanger for recovering latent heat, and a fan are arranged in this order on a downstream side in a flow of a combustion gas produced in a burner. Namely, in the water heater of this type, the fan is arranged downstream of the heat exchanger in the flow of the combustion gas, and the fan suctions combustion gas having passed through the heat exchanger and emits the combustion gas to the outside of the water heater.

In addition, an impeller having a plurality of blades around the rotation shaft is known as a component of the fan (for example, Japanese Patent Laying-Open No. 2000-356197, Japanese Patent Laying-Open No. 2010-242543, Japanese Patent Laying-Open No. 2010-281256, U.S. published patent application No. 2008/0279682 (specification), and Japanese Utility Model Laying-Open No. 04-040191). This impeller is driven by a motor or the like and rotated, thereby achieving the air-blowing function of the fan.

Such an impeller is formed of a plurality of components. There is a known method for producing the impeller by ultrasonic-welding resin components such as a blade to each other for assembly.

Ultrasonic welding is a processing technique for instantaneously melting and joining a thermoplastic resin by minute ultrasonic vibration and welding pressure. According to the ultrasonic welding, a portion welded by ultrasonic waves is generally made of a material that is once melted and thus becomes brittle. Consequently, this portion may often be lower in durability and strength than the base material. Furthermore, when welding is insufficient, durability and strength may be further lowered.

Therefore, when an impeller is produced by means of welding such as ultrasonic welding, sufficient welding of the weld portion is required in order to maintain the durability and strength of the impeller.

Furthermore, it is also conceivable to use a resin containing a fibrous filler in order to increase the strength of the impeller. However, it has been found that, in the case where a resin containing a fibrous filler is used to produce a resin component including a disc-shaped (or annular) main plate and a plurality of blades each extending in the radial direction of the main plate, a distortion occurs in the shape of the resin component, particularly in the shape of the main plate in the radial direction, with the result that the flatness of the main plate tends to decrease.

When a resin component having a main plate with decreased flatness is ultrasonic-welded to another component, these components cannot be equally pressurized, so that ultrasonic vibration cannot be stably transmitted. Consequently, welding of these components tends to be insufficient. Furthermore, when a distortion occurs in the shape of the main plate of the impeller, the motion balance performance of the impeller may be decreased, so that the air-blowing performance may be decreased.

Particularly, the impeller of the fan used for a water heater of an exhaust suction and combustion type is placed within a passage of combustion gas, and therefore, exposed to a higher temperature environment as compared with the conventional case. Furthermore, the impeller of the fan used for a water heater of a latent heat recovery type adapted to an exhaust suction and combustion system is exposed also to strong-acid drainage water produced by recovery of latent heat, in addition to a high-temperature environment. In such a case, it is strongly required to sufficiently weld each component to particularly maintain the durability of the impeller.

SUMMARY OF THE INVENTION

The present invention has been made in light of the above-described problems. An object of the present invention is to provide a highly durable fan that allows sufficient durability to be maintained even under a high temperature environment or an acid environment, and a water heater provided with the fan.

Furthermore, another object of the present invention is to provide an impeller that is excellent in durability and strength and capable of exhibiting stable air-blowing performance, and a water heater provided with the impeller.

A fan of the present invention includes: an impeller including a main plate formed in a disc shape and having a first plane, a plurality of first blades each formed so as to extend from an inner circumferential side to an outer circumferential side of the first plane of the main plate and protrude from the first plane, and a shroud covering the plurality of first blades and formed integrally with the plurality of first blades; a fan case housing the impeller; a drive source attached to the fan case for driving the impeller; and a rotation shaft coupling the impeller and the drive source. The first blades each include: a linearly protruding region that is linearly increased in height from the outer circumferential side to the inner circumferential side; and a curvedly protruding region that is curvedly increased in height from the outer circumferential side to the inner circumferential side, the height extending in a direction in which each first blade protrudes from the first plane. The curvedly protruding region is located closer to the inner circumferential side of the first plane than the linearly protruding region is. The linearly protruding region is welded to the main plate.

In the fan of the present invention, the shroud has an outer circumferential portion having a shape that is linearly inclined in the radial direction of the main plate so as to correspond to the shape of the linearly protruding region of each first blade. Accordingly, a jig of an ultrasonic welding machine is pressed against this outer circumferential portion (the linearly inclined region), thereby improving adhesiveness between the jig and the shroud, so that ultrasonic vibration can be stably transmitted to a weld portion. Thereby, the main plate and each first blade can be sufficiently welded. Therefore, the fan of the present invention has excellent durability.

In the above-described fan, the curvedly protruding region is defined as a non-weld region that is not welded to the main plate.

When the curvedly protruding region is to be welded to the main plate, it is necessary to press the jig of the ultrasonic welding machine against the curvedly inclined region of the shroud (a portion corresponding to the curvedly protruding region of the first blade) for transmitting ultrasonic vibration. However, ultrasonic vibration cannot be sufficiently transmitted to a curved surface, thereby leading to insufficient welding or causing welding strength variations, which are not preferable for a product. Therefore, by not welding the curvedly protruding region to the main plate, it becomes possible to produce an impeller having stable quality but not undergoing variations in strength of welding between the main plate and the first blade. Consequently, the quality of the fan can be stabilized.

In the above-described fan, the impeller further includes a plurality of second blades each formed so as to extend from an inner circumferential side to an outer circumferential side of the second plane of the main plate on a side opposite to the first plane and protrude from the second plane. When the main plate is seen from an axial direction of the rotation shaft, each second blade is located between two first blades adjacent to each other.

Accordingly, at the time of ultrasonic welding, the weld portion of the main plate is supported at its plane from the second plane side (the plane on the second blade side) by a welding jig, so that the main plate is stably held. Consequently, ultrasonic vibration is readily sufficiently transmitted to the weld portion. Therefore, the main plate and the first blade can be sufficiently welded.

In the above-described fan, when the main plate is seen from an axial direction of the rotation shaft, a portion including an outer circumferential end of each of the first blades is disposed in a radial direction of the main plate.

This allows airflow to smoothly flow in the direction along the centrifugal force, which is caused by rotation of the impeller, in the outer circumferential portion onto which the centrifugal force is greatly exerted. Consequently, the weld portion is less likely to come off.

In the above-described fan, when the main plate is seen from the axial direction of the rotation shaft, a portion including an outer circumferential end of each of the second blades is disposed in a radial direction of the main plate.

Accordingly, when the main plate is seen from the axial direction of the rotation shaft, each second blade can be readily disposed so as to be located between two first blades adjacent to each other.

In the above-described fan, a plurality of positioning concave portions are provided in the first plane of the main plate, and the plurality of first blades are inserted into and welded to the plurality of positioning concave portions, respectively.

Accordingly, positional misalignment at the time of welding between the main plate and each first blade can be prevented, so that the welding strength can be improved.

In the above-described fan, a positioning protrusion is formed at an end of the curvedly protruding region of the first blade on a side opposite to the shroud, and the protrusion is fitted in a hole provided in the first plane of the main plate.

Accordingly, positional misalignment of the curvedly protruding region (non-weld region) of the first blade can be prevented.

A water heater of the present invention is a water heater of a latent heat recovery type capable of heating water by recovering latent heat of combustion gas, and includes: a burner generating combustion gas; a heat exchanger heating water flowing through inside by heat exchange with combustion gas; and a fan suctioning combustion gas having passed through the heat exchanger and emitting combustion gas to outside of the water heater. The above-described fan is attached such that a side on which the shroud is provided is located on a side close to the burner.

Consequently, when the shroud and each first blade are integrally formed to weld the main plate and each first blade (formed integrally with the shroud), the weld portion with low durability is located on the underside of the main plate (on the burner side). Accordingly, the weld portion is less likely to be exposed to drainage water, so that the weld portion can be protected from corrosion caused by drainage water. Therefore, it becomes possible to provide a water heater including a highly durable fan that can withstand a high-temperature environment.

An impeller of the present invention includes a main plate, a plurality of first blades, a shroud, and a plurality of second blades. The main plate formed in a disc shape has a first plane and a second plane on a side opposite to the first plane. The first blades each are welded to the first plane of the main plate so as to extend from an inner circumferential side to an outer circumferential side of the first plane and protrude from the first plane. The shroud serves to cover the plurality of first blades. The second blades each are formed so as to extend from an inner circumferential side to an outer circumferential side of the second plane and protrude from the second plane. The main plate and the plurality of second blades are integrally molded by a resin containing a fibrous filler. The second blades each have at least one of a configuration in which each second blade extends so as to cross a radial direction of the main plate and a configuration in which each second blade is separated by a slit into an inner blade member located on the inner circumferential side and an outer blade member located on the outer circumferential side.

The present inventors have carried out concentrated studies to consequently find that, when the main plate and the second blades are integrally molded by a resin containing a fibrous filler, the second blades act to resist shrinkage of the main plate, thereby causing a distortion to occur in the main plate.

Specifically, the present inventors have found as follows: in an integrally molded product including a main plate and second blades and integrally molded by a resin containing a fibrous filler, the filler tends to spread relatively randomly in the disc-shaped main plate, whereas the filler tends to be oriented in each second blade in its extending direction. Accordingly, if each second blade extends along a straight line in the radial direction of the main plate, the filler oriented in the second blade acts as large resistance against radial shrinkage of the resin, thereby causing a difference in shrinkage amount of the main plate in the radial direction of the main plate between the region where a second blade is formed and the region where a second blade is not formed. This causes uneven shrinkage of the resin in the radial direction at the time when the main plate is molded, with the result that the flatness of the main plate is decreased.

In contrast, in the case where the second blade is configured to extend so as to cross the radial direction of the main plate, it becomes possible to reduce resistance by the filler oriented in the second blade against radial shrinkage of the resin. The same also applies to the case where the second blade is configured to be separated by a slit into an inner blade member located on the inner circumferential side and an outer blade member located on the outer circumferential side.

Therefore, according to the impeller of the present invention, it becomes possible to suppress uneven shrinkage of the main plate in the radial direction caused by existence of the second blade. Accordingly, the flatness of the main plate can be improved, so that the integrally molded product including the main plate and the second blade can be sufficiently welded to another component. Therefore, excellent durability and strength can be achieved while stable air-blowing performance can be exhibited.

According to the above-described impeller, at least a part of each second blade is formed in a curved line in plan view as seen from a direction orthogonal to the second plane of the main plate.

Accordingly, it becomes possible to reduce resistance caused by the filler oriented in the second blade against radial shrinkage of the resin, so that the flatness of the main plate can be more improved.

According to the above-described impeller, each second blade has an S-shape in plan view as seen from a direction orthogonal to the second plane of the main plate.

Accordingly, it becomes possible to reduce the resistance caused by the filler oriented in the second blade against radial shrinkage of the resin, so that the flatness of the main plate can be further improved.

In the above-described impeller, the second blade is configured to be separated by the slit into the inner blade member located on the inner circumferential side and the outer blade member located on the outer circumferential side, and a third blade extending from the inner circumferential side to the outer circumferential side of the second plane is provided between the outer blade members adjacent to each other.

Accordingly, the air-blowing capability on the second plane side of the impeller can be improved.

In the above-described impeller, a positioning protrusion is provided at an end of each first blade on a side opposite to the shroud, a positioning hole is provided in the second plane of the main plate between the second blades adjacent to each other, and the protrusion is fitted in the hole.

Accordingly, positional misalignment at the time of welding between the main plate and the first blade can be prevented, so that welding strength can be increased.

In the above-described impeller, a boss portion protruding from the first plane is provided in a center portion of the main plate, and a bearing hole penetrating from the first plane toward the second plane is provided in a center portion of the boss portion. The boss portion is formed so as to be continuously increased in size from an end portion of the boss portion toward the first plane, and a thinned portion is provided in the boss portion on the second plane side.

Accordingly, the strength of the boss portion can be increased while a distortion of the boss portion can be suppressed.

A water heater of the present invention includes: a burner generating combustion gas; a heat exchanger heating water flowing through inside by heat exchange with combustion gas; and a fan suctioning combustion gas having passed through the heat exchanger and emitting combustion gas to outside of the water heater. The fan includes a fan case, an impeller housed within the fan case, a drive source attached outside the fan case, and a rotation shaft coupling the impeller and the drive source. The fan case has a back surface wall provided with a through hole. The impeller is arranged so as to have the second plane facing the back surface wall. A gap through which air outside the fan case is suctioned into the fan case is provided between the rotation shaft penetrating the through hole and the back surface wall. The impeller included in this water heater is the impeller as described above.

According to the water heater of the present invention, the air-blowing capability of the fan can be achieved by the air-blowing force on the first plane side of the impeller while the drive source can be cooled and backflow of combustion gas can be prevented by the air-blowing force on the second plane side of the impeller. Furthermore, since the impeller is excellent in durability and strength and can exhibit stable air-blowing performance, excellent fan performance can be achieved.

An impeller of the present invention includes a first member and a second member. The first member includes a shroud formed in an annular shape and a first blade that is formed so as to extend from an inner circumferential side to an outer circumferential side of a first back surface of the shroud and protrude from the first back surface. The second member includes a main plate formed in a disc shape and a second blade that is formed so as to extend from an inner circumferential side to an outer circumferential side of a second back surface of the main plate and protrude from the second back surface. The first member and the second member are integrally molded by a resin containing a fibrous filler. The first member and the second member are coupled by welding the first blade and a second front surface on a side opposite to the second back surface. Furthermore, at least one of the second front surface and a first front surface on a side opposite to the first back surface includes an inner circumferential side gate mark portion located on a circumference on the inner circumferential side and an outer circumferential side gate mark portion located on a circumference close to the outer circumferential side relative to the inner circumferential side gate mark portion.

The present inventors have found that the uniformity of the shape of the shroud (main plate) is decreased when the first member (second member) made of a resin containing a fibrous filler is molded using a molding die including: a first space (corresponding to the shroud or the main plate) having an area extending in the circumferential direction; and a second space (corresponding to the first blade or the second blade) provided in a slit shape so as to protrude from this first space, and also including: a gate provided in the first space on the inner circumferential side. The present inventors have also found as follows: the filler tends to spread relatively randomly in the first space, whereas the filler tends to be oriented in the second space in its extending direction, in which case the filler oriented in the second space acts to resist shrinkage of the resin in the first space. Accordingly, the shrinkage amount of the resin in the radial direction of the shroud and the main plate is different between the region where the first and second blades are formed and the region where the first and second blades are not formed. This causes uneven shrinkage of the resin in the radial direction at the time when the shroud and the main plate are molded, with the result that the uniformity of the shape of each of the shroud and the main plate is deteriorated.

In contrast, when a resin is injected not only from the inner circumferential side gate located on the circumference on the inner circumferential side in the first space but also from the outer circumferential side gate located on the circumference close to the outer circumferential side relative to the inner circumferential side gate, the flow of the resin moving from the outer circumferential side in the first space of the molding die through the outer circumferential side gate exerts an influence upon the flow of the resin moving from the inner circumferential side to the outer circumferential side in the first space of the molding die through the inner circumferential side gate. This causes a disturbance in the flow of the resin from the inner circumferential side gate. Accordingly, as compared with the case where a resin is injected only from the inner circumferential side gate, orientation of the filler in the second space can be suppressed, so that resistance caused by the orientation of the filler can be reduced.

In the second member, the second front surface of the main plate has an inner circumferential side gate mark portion located on the circumference on the inner circumferential side and an outer circumferential side gate mark portion located on the circumference close to the outer circumferential side relative to the inner circumferential side gate mark portion. This second member is molded by injecting a resin from the inner circumferential side gate located on the circumference on the inner circumferential side in the space for a main plate and also from the outer circumferential side gate located on the circumference close to the outer circumferential side relative to the inner circumferential side gate. Therefore, in the second member having such a gate mark, uneven shrinkage of the main plate in the radial direction caused by existence of the second blade can be suppressed for the reason as described above. Consequently, the uniformity of the shape of the main plate can be improved, thereby allowing sufficient welding between the first member and the second member that includes the main plate and the second blade. Accordingly, excellent durability and strength can be achieved while stable air-blowing performance can be exhibited.

On the other hand, in the first member, the first front surface of the shroud has an inner circumferential side gate mark portion located on the circumference on the inner circumferential side and an outer circumferential side gate mark portion located on the circumference close to the outer circumferential side relative to the inner circumferential side gate mark portion. This first member is molded by injecting a resin from the inner circumferential side gate located on the circumference on the inner circumferential side in the space for a shroud and also from the outer circumferential side gate located on the circumference close to the outer circumferential side relative to the inner circumferential side gate. Therefore, in the first member having such a gate mark, uneven shrinkage of the shroud in the radial direction caused by existence of the first blade can be suppressed for the same reason. Accordingly, the uniformity of the shape of the shroud can be improved, thereby allowing sufficient welding between the second member and the first member that includes the shroud and the first blade. Consequently, excellent durability and strength can be achieved while stable air-blowing performance can be exhibited.

In the above-described impeller, the inner circumferential side gate mark portion has a plurality of inner circumferential side gate marks while the outer circumferential side gate mark portion has a plurality of outer circumferential side gate marks. The inner circumferential side gate marks and the outer circumferential side gate marks that are located on the same plane are equal in number, and a corresponding one of the inner circumferential side gate marks and a corresponding one of the outer circumferential side gate marks are located on the same straight line extending in a radial direction on the same plane.

The inner circumferential side gate mark portion has a plurality of inner circumferential side gate marks and the outer circumferential side gate mark portion has a plurality of outer circumferential side gate marks, thereby allowing a resin to evenly spread in the circumferential direction at the time of molding of each member. Accordingly, the homogeneity of the first member (the second member) is improved. Furthermore, the inner circumferential side gate marks and the outer circumferential side gate marks that are located on the same plane are equal in number, and a corresponding one of the inner circumferential side gate marks and a corresponding one of the outer circumferential side gate marks are located on the same straight line extending in the radial direction on the same plane. Thereby, at the time when each member is molded, the flow of the resin coming from the outer circumferential side gate exerts a great influence upon the flow of the resin coming from the inner circumferential side gate. This causes a greater disturbance in the flow of the resin coming from the inner circumferential side gate into the space of the molding die. Therefore, the orientation of the filler in the space for the first blade or the space for the second blade can be further suppressed, so that uneven shrinkage of the shroud (main plate) in the radial direction caused by existence of the first blade (second blade) can be suppressed.

In the above-described impeller, at least one of the plurality of outer circumferential side gate marks has an elliptical shape.

In the case where the outer circumferential side gate is provided such that the resin injected from the outer circumferential side gate flows in the circumferential direction of the main plate (shroud), the outer circumferential side gate mark thereof is formed in an elliptical shape. When the resin injected from the outer circumferential side gate flows in the circumferential direction, the orientation of the filler on the outer circumferential side is to extend along the circumferential direction rather than the radial direction. Accordingly, the orientation of the filler in the space for the second blade, particularly the orientation of the filler on the outer circumferential side, can be sufficiently suppressed, so that the above-described resistance caused by the orientation of the filler can be reduced.

In the above-described impeller, at least one of the first member and the second member is integrally molded by injecting a resin containing a fibrous filler from a position of the inner circumferential side gate mark portion and injecting a resin containing a spherical filler from a position of the outer circumferential side gate mark portion.

At the time of molding, the resin containing a spherical filler is injected from the outer circumferential side gate, thereby suppressing orientation of the fibrous filler on the outer circumferential side. Accordingly, the above-described resistance caused by the orientation of the filler can be reduced.

A water heater of the present invention includes: a burner generating combustion gas; a heat exchanger heating water flowing through inside by heat exchange with combustion gas; and a fan suctioning combustion gas having passed through the heat exchanger and emitting combustion gas to outside of the water heater. The fan includes a fan case, an impeller housed within the fan case, a drive source attached outside the fan case, and a rotation shaft coupling the impeller and the drive source. The fan case has a back surface wall provided with a through hole. The impeller is arranged so as to have the second back surface facing the back surface wall. A gap through which air outside the fan case is suctioned into the fan case is provided between the rotation shaft penetrating the through hole and the back surface wall. The impeller included in this water heater is the impeller as described above.

According to the water heater of the present invention, the air-blowing capability of the fan can be achieved by the air-blowing force of the first blade of the impeller while the drive source can be cooled and backflow of combustion gas can be prevented by the air-blowing force of the second blade of the impeller. Furthermore, since the impeller is excellent in durability and strength and also can exhibit stable air-blowing performance, excellent fan performance can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
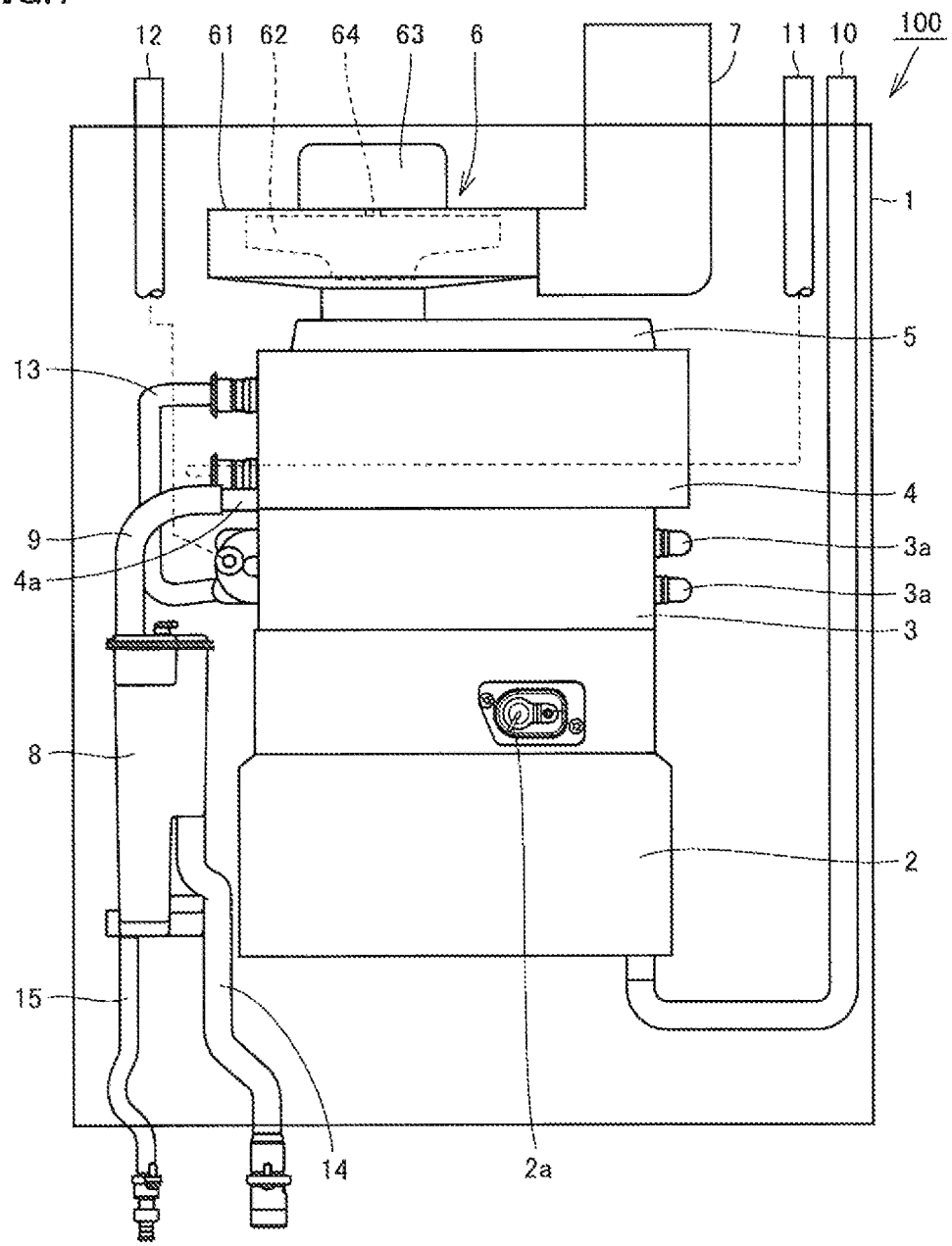
FIG. 1 is a front view schematically showing the configuration of a water heater in the first embodiment.

The embodiments of the present invention will be hereinafter described with reference to the accompanying drawings, in which the same or corresponding components are designated by the same reference characters. Furthermore, the dimensional relation of a length, a width a thickness, a depth, and the like is modified as appropriate for the purpose of clarifying and simplifying each figure, and is not to actual scale. In each figure, the same components are designated by the same reference characters, and description thereof will not be repeated.

First Embodiment (Configuration)

The configuration of a fan and a water heater in the first embodiment will be hereinafter described with reference to FIGS. 1 to 8. In each figure, the same components are designated by the same reference characters, and description thereof will not be repeated.

Figure 2:
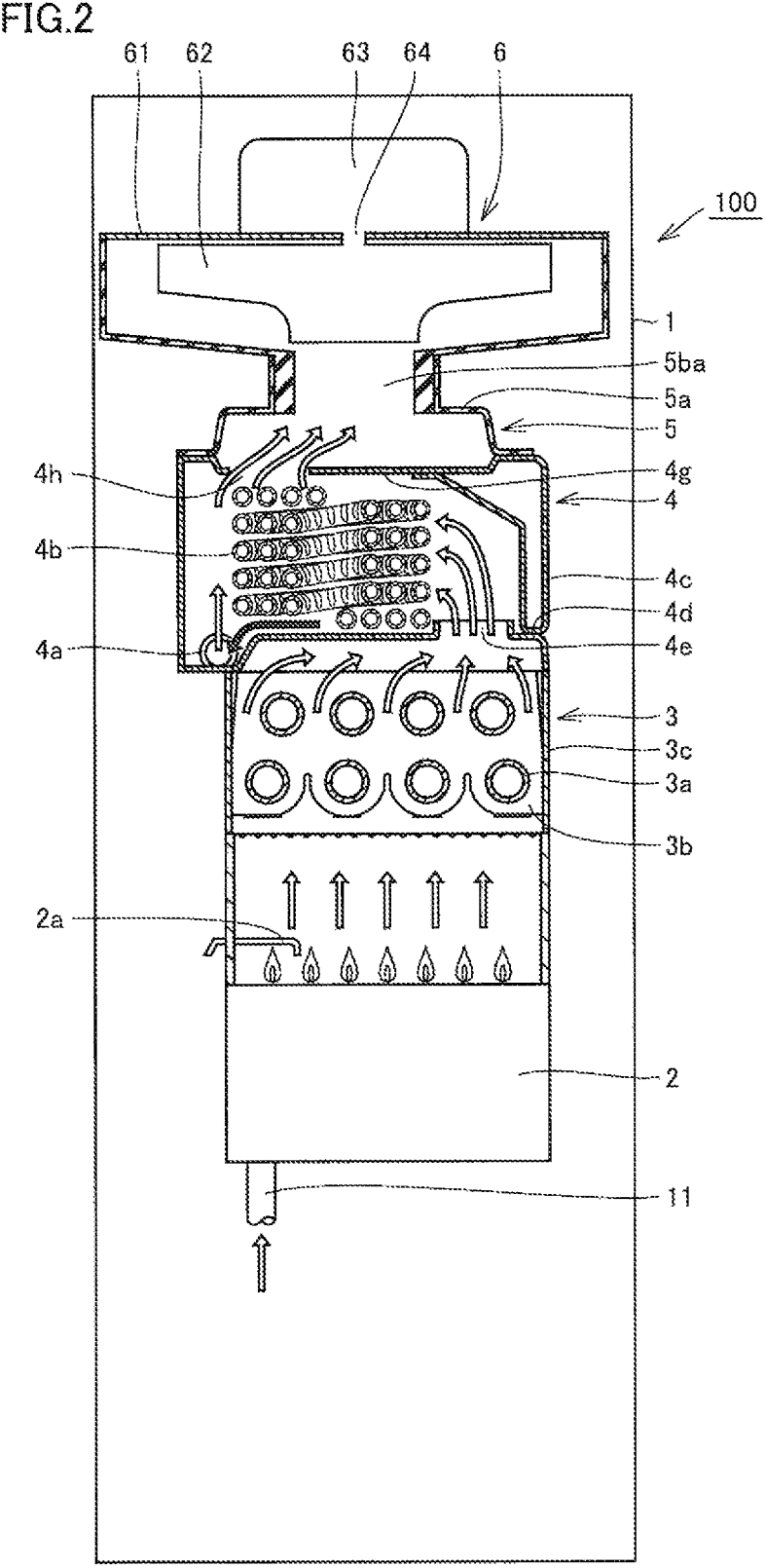
FIG. 2 is a partial cross-sectional side view schematically showing the configuration of the water heater shown in FIG. 1.

Referring mainly to FIGS. 1 and 2, a water heater 100 of the present embodiment serves as a water heater of a latent heat recovery type adapted to an exhaust suction and combustion system. This water heater 100 mainly includes a housing 1, a burner 2, a primary heat exchanger 3, a secondary heat exchanger 4, an exhaust box 5, a fan 6, an exhaust tube 7, a drainage water tank 8, and pipes 9 to 15.

Burner 2 serves to produce a combustion gas by burning a fuel gas. A gas supply pipe 10 is connected to burner 2. This gas supply pipe 10 serves to supply a fuel gas to burner 2. A gas valve (not shown) implemented, for example, by an electromagnetic valve is attached to this gas supply pipe 10.

A spark plug 2a is arranged above burner 2. This spark plug 2a serves to ignite an air fuel mixture injected from burner 2 to thereby produce a flame, by generating sparks between the plug and a target (not shown) provided in burner 2. Burner 2 generates a quantity of heat by burning a fuel gas supplied from gas supply pipe 10 (which is called a combustion operation).

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with the combustion gas generated by burner 2, and specifically, serves to heat water which flows through heat conduction pipe 3a of primary heat exchanger 3 with the quantity of heat generated as a result of the combustion operation of burner 2.

Referring mainly to FIG. 2, secondary heat exchanger 4 is a heat exchanger of a latent heat recovery type. This secondary heat exchanger 4 is located downstream of primary heat exchanger 3 in a flow of the combustion gas and connected in series with primary heat exchanger 3. Since water heater 100 according to the present embodiment thus has secondary heat exchanger 4 of a latent heat recovery type, it is a water heater of the latent heat recovery type.

Secondary heat exchanger 4 mainly has a drainage water discharge port 4a, a heat conduction pipe 4b, a sidewall 4c, a bottom wall 4d, and an upper wall 4g. Heat conduction pipe 4b is layered as it is spirally wound. Sidewall 4c, bottom wall 4d, and upper wall 4g are arranged to surround heat conduction pipe 4b.

In secondary heat exchanger 4, water flowing through heat conduction pipe 4b is pre-heated (heated) through heat exchange with the combustion gas of which heat has been exchanged in primary heat exchanger 3. As a temperature of the combustion gas is lowered to approximately 60° C. through this process, moisture contained in the combustion gas is condensed so that latent heat can be obtained. In addition, latent heat is recovered in secondary heat exchanger 4 and moisture contained in the combustion gas is condensed, thereby producing drainage water.

Bottom wall 4d serves as a partition between primary heat exchanger 3 and secondary heat exchanger 4, and also serves as an upper wall of primary heat exchanger 3. This bottom wall 4d is provided with an opening 4e that allows communication between a space where heat conduction pipe 3a of primary heat exchanger 3 is arranged and a space where heat conduction pipe 4b of secondary heat exchanger 4 is arranged. As shown with hollow arrows in FIG. 2, the combustion gas can flow from primary heat exchanger 3 to secondary heat exchanger 4 through opening 4e. In this embodiment, for the sake of simplification, although one common component is employed for bottom wall 4d of secondary heat exchanger 4 and the upper wall of primary heat exchanger 3, an exhaust collection and guide member may be connected between primary heat exchanger 3 and secondary heat exchanger 4.

Furthermore, upper wall 4g is provided with an opening 4h. This opening 4h allows communication between the space where heat conduction pipe 4b of secondary heat exchanger 4 is arranged and an internal space in exhaust box 5. As shown with hollow arrows in FIG. 2, the combustion gas can flow from secondary heat exchanger 4 into the internal space in exhaust box 5 through opening 4h.

Drainage water discharge port 4a is provided in sidewall 4c or bottom wall 4d. This drainage water discharge port 4a opens at a lowest position in the space surrounded by side wall 4c, bottom wall 4d and upper wall 4g (at a lowermost position in a vertical direction in the state where the water heater is placed), which is lower than the lowermost end of heat conduction pipe 4b. Thus, drainage water produced in secondary heat exchanger 4 can be guided to drainage water discharge port 4a along bottom wall 4d and sidewall 4c as shown with black arrows in FIG. 2.

Figure 3:
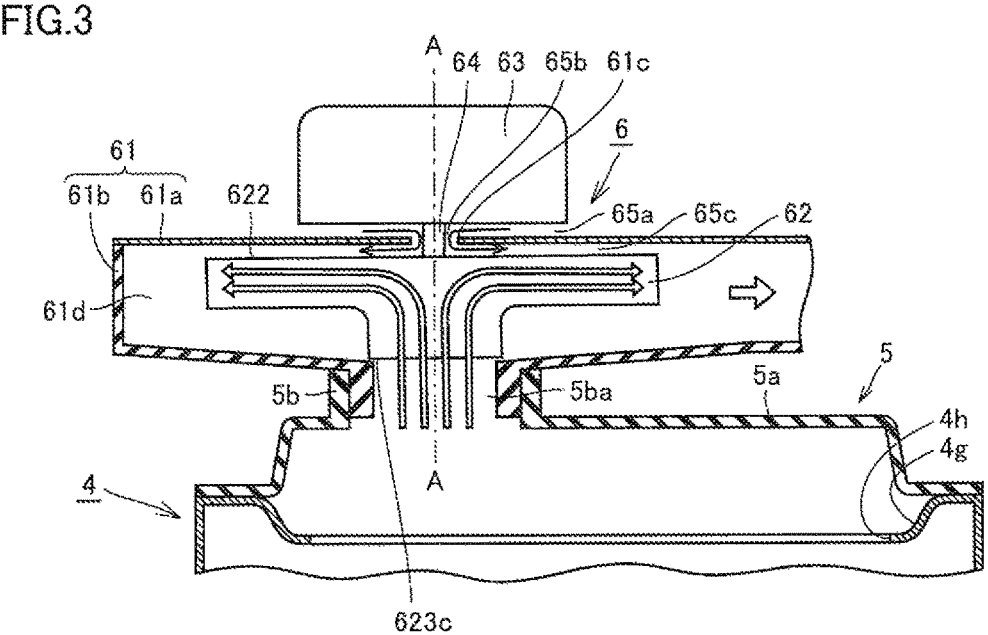
FIG. 3 is a partial cross-sectional view schematically showing a fan and an exhaust box in the first embodiment.

Referring mainly to FIGS. 2 and 3, exhaust box 5 forms a path for a flow of the combustion gas between secondary heat exchanger 4 and fan 6. This exhaust box 5 can guide the combustion gas of which heat has been exchanged in secondary heat exchanger 4 to fan 6. Exhaust box 5 is attached to secondary heat exchanger 4 and located downstream of secondary heat exchanger 4 in the flow of the combustion gas.

Exhaust box 5 mainly has a box main body 5a and a fan connection portion 5b. The internal space of box main body 5a communicates through opening 4h of secondary heat exchanger 4 with the internal space in which heat conduction pipe 4b of secondary heat exchanger 4 is disposed. Fan connection portion 5b is provided so as to protrude from the upper portion of box main body 5a. This fan connection portion 5b has a cylindrical shape, for example, and has an internal space 5ba that communicates with the internal space of box main body 5a.

Referring mainly to FIGS. 1 and 3, fan 6 mainly has a fan case 61, an impeller 62, a drive source 63, and a rotation shaft 64. Fan 6 serves to emit the combustion gas (of which heat has been exchanged in secondary heat exchanger 4) which has passed through secondary heat exchanger 4 to the outside of water heater 100 by suctioning the combustion gas, and this fan is connected to exhaust tube 7 leading to the outside of water heater 100. This fan 6 is located downstream of exhaust box 5 and secondary heat exchanger 4 in the flow of the combustion gas. Namely, in water heater 100, burner 2, primary heat exchanger 3, secondary heat exchanger 4, exhaust box 5, and fan 6 are arranged in this order from upstream to downstream in the flow of the combustion gas produced in burner 2. Since the combustion gas is suctioned and exhausted by means of fan 6 as above in this arrangement, water heater 100 in the present embodiment is a water heater of an exhaust suction and combustion type.

Referring mainly to FIG. 3, fan case 61 mainly includes a back surface wall 61a provided with a through hole 61c and a circumferential wall 61b surrounding back surface wall 61a, and has an internal space 61d in which impeller 62 is housed in a rotatable manner In FIG. 3, although back surface wall 61a and circumferential wall 61b are formed by different members, back surface wall 61a and circumferential wall 61b may be integrally formed.

Referring mainly to FIGS. 3 to 6, impeller 62 is housed within fan case 61 (on one side of back surface wall 61a). Impeller 62 mainly has a disc-shaped main plate 620, a plurality of first blades 621, a plurality of second blades 622, a shroud 623, and a boss portion 624.

Main plate 620 has a first plane 620a and a second plane 620b on the side opposite to first plane 620a. A plurality of first blades 621 are provided on first plane 620a while a plurality of second blades 622 are provided on second plane 620b. Shroud 623 is provided so as to entirely cover the plurality of first blades 621, and provided in its center portion with an opening 623c.

Figure 6:
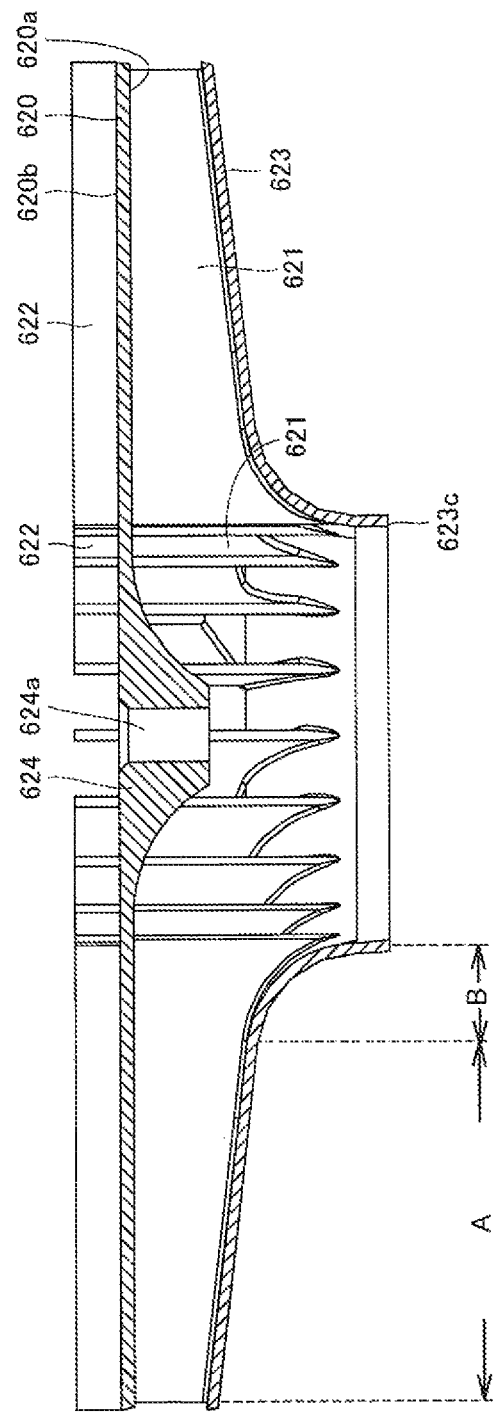
FIG. 6 is a cross-sectional view schematically showing the configuration of the impeller in the first embodiment.

Furthermore, a boss portion 624 protruding from first plane 620a is provided in the center portion of first plane 620a of main plate 620. Boss portion 624 is provided in its center portion with a bearing hole 624a passing therethrough from the first plane 620a side to the second plane 620b side (FIG. 6). When rotation shaft 64 penetrates this bearing hole 624a, impeller 62, rotation shaft 64 and drive source 63 can be connected.

Figure 4:
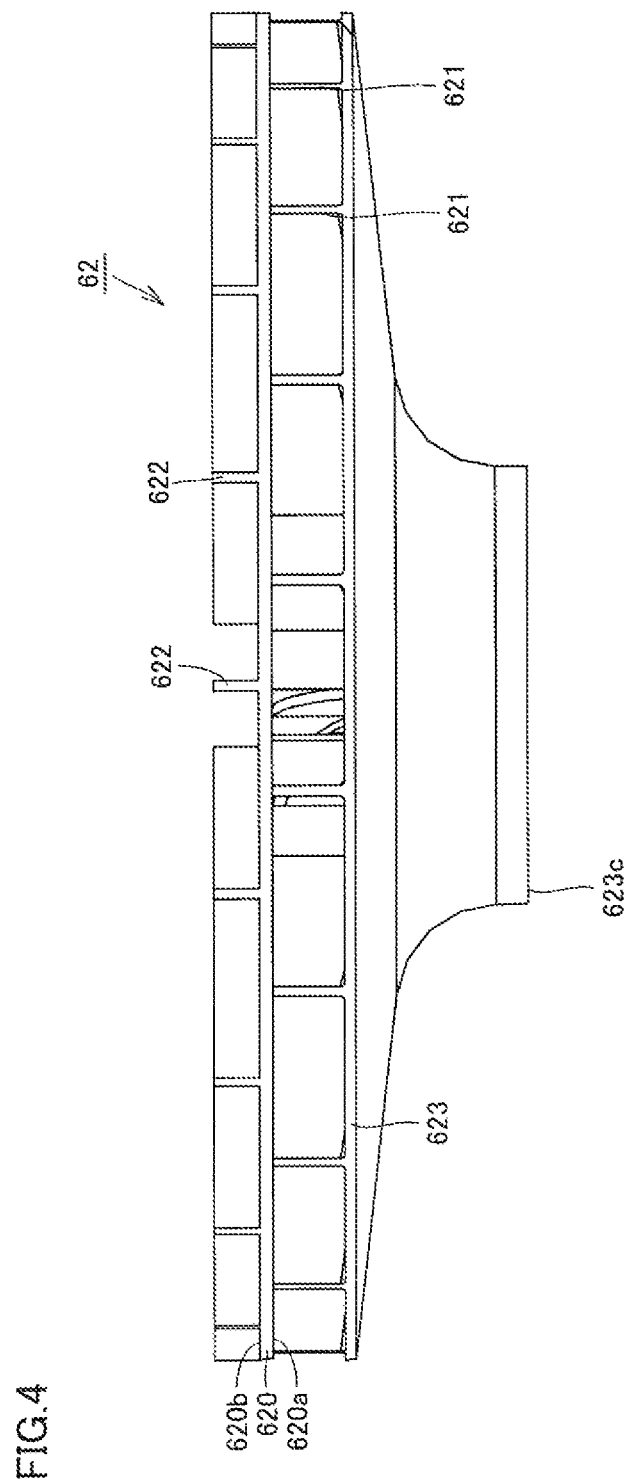
FIG. 4 is a side view schematically showing the configuration of an impeller in the first embodiment.

Referring mainly to FIGS. 3 and 4, impeller 62 is arranged within fan case 61 such that first plane 620a is located on the fan connection portion 5b side opposite to back surface wall 61a (on one side of back surface wall 61a). Furthermore, as shown in FIG. 3, shroud 623 is arranged such that its opening 623c faces internal space 5ba while second blade 622 is arranged so as to face back surface wall 61a.

According to the above-described configuration, by the air-blowing capability of first blade 621, combustion gas can be suctioned from box main body 5a of exhaust box 5 through fan connection portion 5b into fan case 61, as shown by the hollow arrows in FIG. 3. In other words, in the present embodiment, by means of rotation of impeller 62, the combustion gas within exhaust box 5 is suctioned from the inner circumferential side of first plane 620a of impeller 62 and emitted to the outer circumferential side thereof.

In addition, the plurality of first blades 621 are covered by shroud 623 having opening 623c, thereby allowing improvement in the air-blowing capability of the fan as compared with the case where shroud 623 is not provided.

Referring mainly to FIG. 6, first blades 621 each are formed so as to extend from the inner circumferential side to the outer circumferential side of first plane 620a of the main plate and to protrude from first plane 620a. First blades 621 are separately provided on first plane 620a and do not come in contact with each other.

Each first blade 621 includes: a linearly protruding region (a region A in FIG. 6) that is linearly increased in height from the outer circumferential side toward the inner circumferential side; and a curvedly protruding region (a region B in FIG. 6) that is curvedly increased in height from the outer circumferential side toward the inner circumferential side, this height extending in the direction in which first blade 621 protrudes from first plane 620a. In first plane 620a, the curvedly protruding region is located closer to the inner circumferential side than the linearly protruding region is. The linearly protruding region is welded to main plate 620. Furthermore, the curvedly protruding region of first blade 621 is defined as a non-weld region that is not welded to main plate 620.

Figure 7:
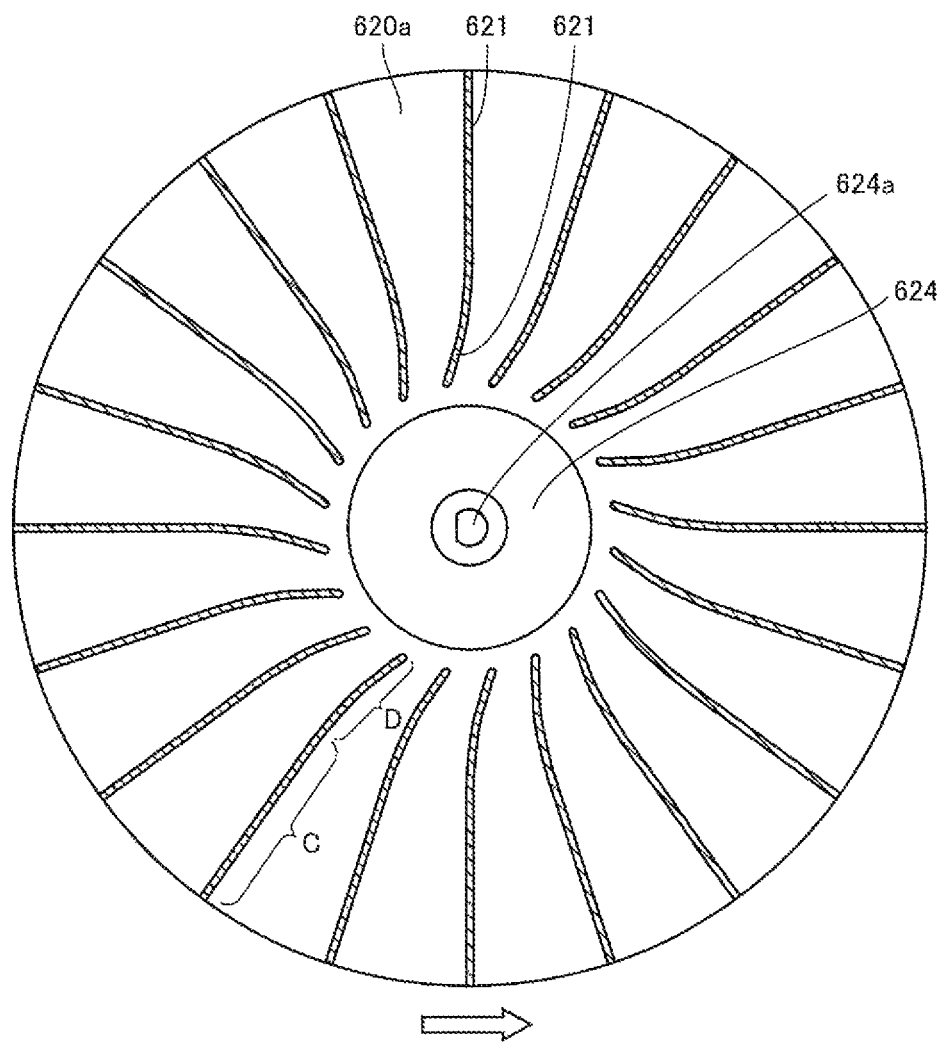
FIG. 7 is an exploded plan view for illustrating the configuration of the first blade included in the impeller of the water heater shown in FIG. 1.

Referring mainly to FIGS. 6 and 7, when first plane 620a is seen from the axial direction of rotation shaft 64 (an axis A shown by an alternate long and short dash line in FIG. 3), first blade 621 has a length including: a linearly extending region linearly extending from the outer circumferential side to the inner circumferential side of first plane 620a (a region C in FIG. 7); and a curvedly extending region curvedly extending from the outer circumferential side to the inner circumferential side of first plane 620a (a region D in FIG. 7). The curvedly extending region is located closer to the inner circumferential side than the linearly extending region is.

Thereby, the flow passage between first blades 621 adjacent to each other is formed so as to be curved in the rotation direction of main plate 620 on the suctioning side (inner circumferential side) and formed to have a linear flow passage on the emitting side (outer circumferential side). In addition, the direction in which the curvedly extending region is curved is the same as the rotation direction of main plate 620 (indicated by a hollow arrow in FIG. 7).

Furthermore, the length of first blade 621 in the direction in which this first blade 621 protrudes from first plane 620a (the distance between a position at which first blade 621 is in contact with first plane 620a and a portion of first blade 621 that is farthest away from first plane 620a in the axial direction of this position) is defined as a "height" of first blade 621. The same also applies to second blade 622. In the present specification, the distance between both ends of first blade 621 extending from the inner circumferential side to the outer circumferential side of main plate 620 (the distance extending along the line appearing where first blade 621 and first plane 620a come in contact with each other) is defined as a "length" of first blade 621. The same also applies to second blade 622.

According to the above-described configuration, relative to rotating impeller 62, the inlet port of the flow passage is curved in the rotation direction of impeller 62, thereby allowing the combustion gas to more efficiently flow into the flow passage. Furthermore, on the gas emitting side on which the centrifugal force is more likely to be applied to the combustion gas flowing through the flow passage, the direction of the flow passage and the direction in which the centrifugal force is applied can be oriented in a more similar direction. Accordingly, the combustion gas flowing toward the gas emitting side is more efficiently accelerated by the centrifugal force. Therefore, the air-blowing capability of the fan is consequently improved.

Figure 5:
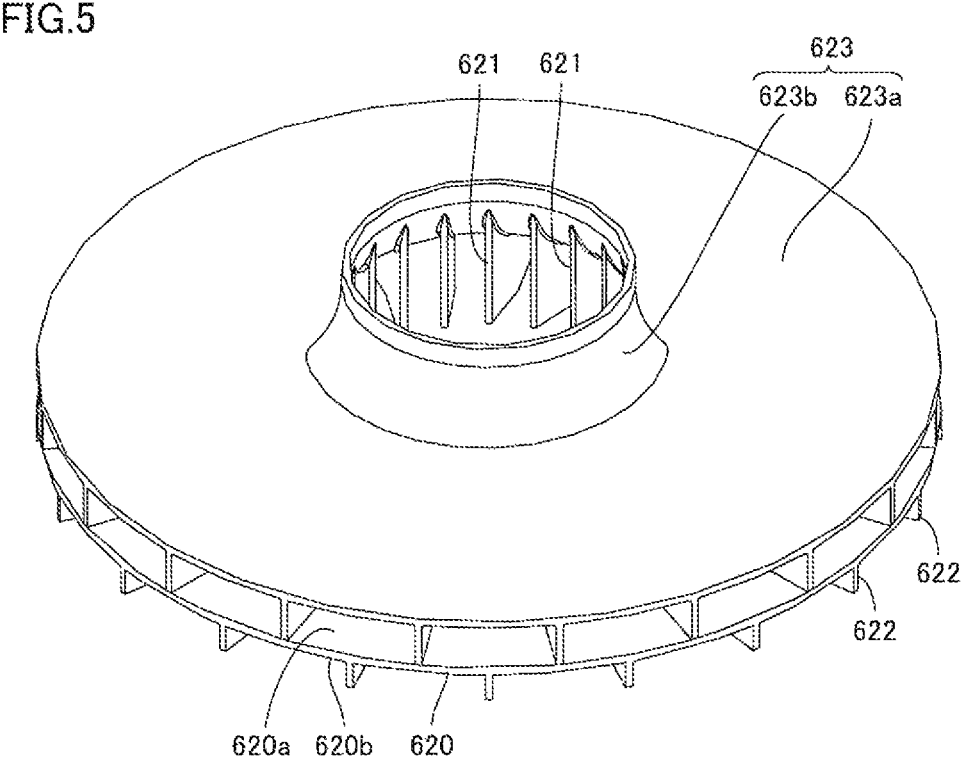
FIG. 5 is a perspective view schematically showing the configuration of the impeller in the first embodiment.

Referring mainly to FIGS. 4 to 6, shroud 623 is spaced apart from first plane 620*a*, provided so as to entirely cover the ends of first blades 621 in the direction in which each first blade 621 protrudes, and provided in its center portion with opening 623*c*.

The inner circumferential side of the plane of shroud 623 on the side opposite to first blade 621 (a curvedly inclined region 623*b*) has a shape curvedly inclined in the radial direction so as to correspond to the shape of first blade 621. In this way, shroud 623 is generally shaped to extend along the height of each blade to be covered, so as not to interfere with air flowing between the blades.

Figure 8:
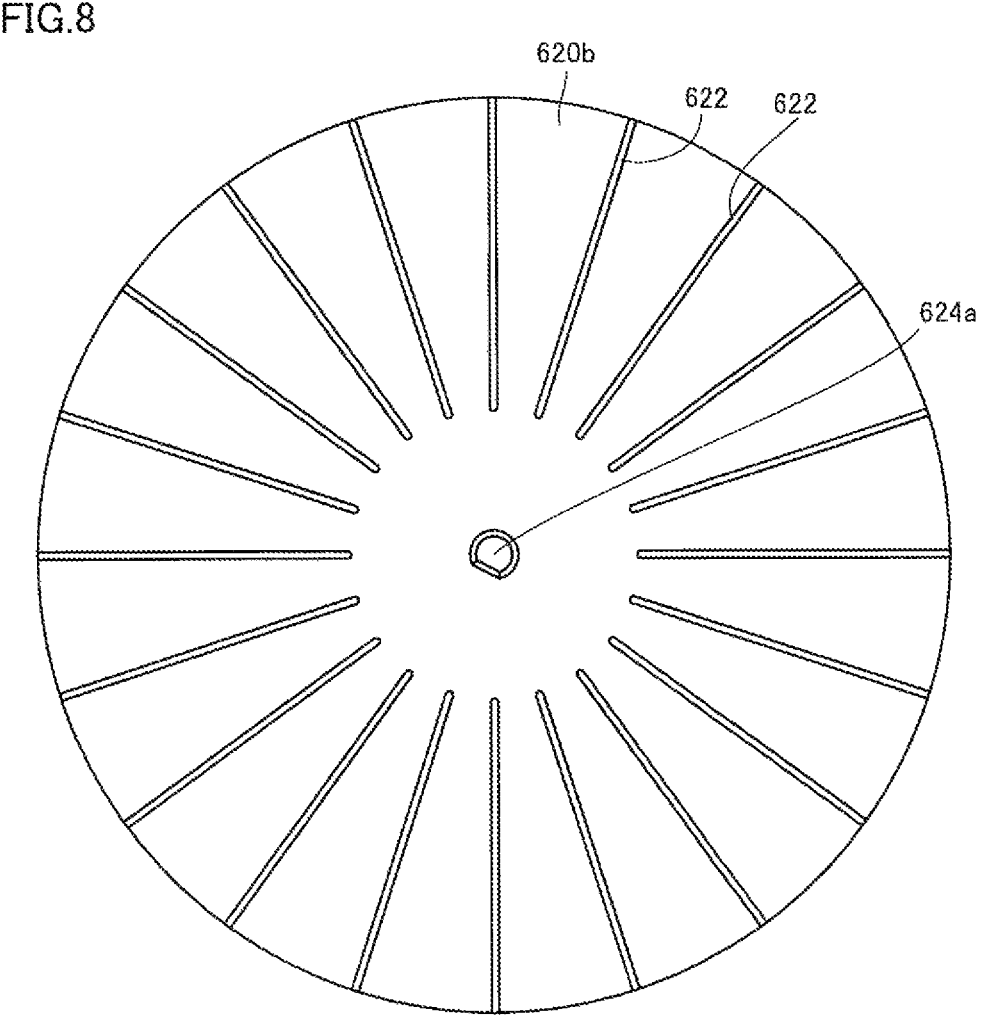
FIG. 8 is a plan view for illustrating the configuration of the second blade included in the impeller of the water heater shown in FIG. 1.

Referring mainly to FIGS. 6 and 8, second blades 622 each are formed so as to extend from the inner circumferential side to the outer circumferential side of second plane 620*b* and also to protrude from second plane 620*b*. Second blades 622 are separately provided on first plane 620*a* and do not come in contact with each other.

Furthermore, referring to FIG. 4, in impeller 62 of the present embodiment, when main plate 620 is seen from the axial direction, each of second blades 622 is located between first blades 621 adjacent to each other.

Furthermore, when main plate 620 is seen from the axial direction of the rotation shaft, a portion including an outer circumferential end of each of the plurality of first blades 621 is disposed in the radial direction of main plate 620. This radial direction means a direction of the straight line extending on the first plane of main plate 620 and passing through the rotation shaft.

Furthermore, when main plate 620 is seen from the axial direction of the rotation shaft, a portion including an outer circumferential end of each of the plurality of second blades 622 is disposed in the radial direction of main plate 620. This radial direction means a direction of the straight line extending on the second plane of main plate 620 and passing through the rotation shaft.

Referring mainly to FIGS. 1 and 3, drive source 63 is provided outside the fan case 61 (on back surface wall 61*a* on the side opposite to impeller 62). In water heater 100 of the present embodiment, gap 65*a* between drive source 63 and back surface wall 61*a* is in communication with gap 65*b* between through hole 61*c* and rotation shaft 64. In other words, gap 65*b* between through hole 61*c* provided in back surface wall 61*a* and rotation shaft 64 allows communication between the outside of fan case 61 (gap 65*a* between drive source 63 and back surface wall 61*a*) and the inside of fan case 61 (gap 65*c* between back surface wall 61*a* and impeller 62).

Rotation shaft 64 penetrates through hole 61*c* of fan case 61, thereby coupling impeller 62 housed within fan case 61 and drive source 63 provided outside fan case 61. Accordingly, impeller 62 is provided with drive force from drive source 63 and can rotate around rotation shaft 64.

Referring mainly to FIG. 1, exhaust tube 7 is disposed outside water heater 100, and connected to the outer circumferential side of fan case 61. Accordingly, the combustion gas emitted to the outer circumferential side by first blade 621 of impeller 62 can be emitted to the outside of water heater 100 through exhaust tube 7.

Referring mainly to FIG. 1, drainage water tank 8 serves to store drainage water produced in secondary heat exchanger 4. This drainage water tank 8 and drainage water discharge port 4*a* of secondary heat exchanger 4 are connected by drainage water discharge pipe 9. The acid drainage water stored in drainage water tank 8 is for example temporarily stored in the internal space of drainage water tank 8, and then, usually discharged through a drainage water discharge pipe 14 to the outside of water heater 100.

It is to be noted that the lower portion of drainage water tank 8 is connected to a drainage water outlet pipe 15 separately from drainage water discharge pipe 14. This drainage water outlet pipe 15 (usually closed) is designed to be opened during maintenance or the like, thereby allowing discharge of the drainage water within drainage water tank 8 that cannot be discharged through drainage water discharge pipe 14. An internal space in drainage water tank 8 may be filled with a neutralization agent (not shown) for neutralizing acid drainage water.

Referring mainly to FIG. 1, a gas supply pipe 10 is connected to burner 2. Water supply pipe 11 is connected to heat conduction pipe 4*b* of secondary heat exchanger 4 (see FIG. 2) and hot water delivery pipe 12 is connected to heat conduction pipe 3*a* of primary heat exchanger 3 (see FIG. 2). Heat conduction pipe 3*a* of primary heat exchanger 3 and heat conduction pipe 4*b* of secondary heat exchanger 4 are connected to each other through connection pipe 13. Each of gas supply pipe 10, water supply pipe 11, and hot water delivery pipe 12 leads to the outside, for example, in a top portion of water heater 100.

(Production of Impeller)

Then, production of an impeller will be hereinafter described with reference to FIGS. 9 to 17.

Figure 9:
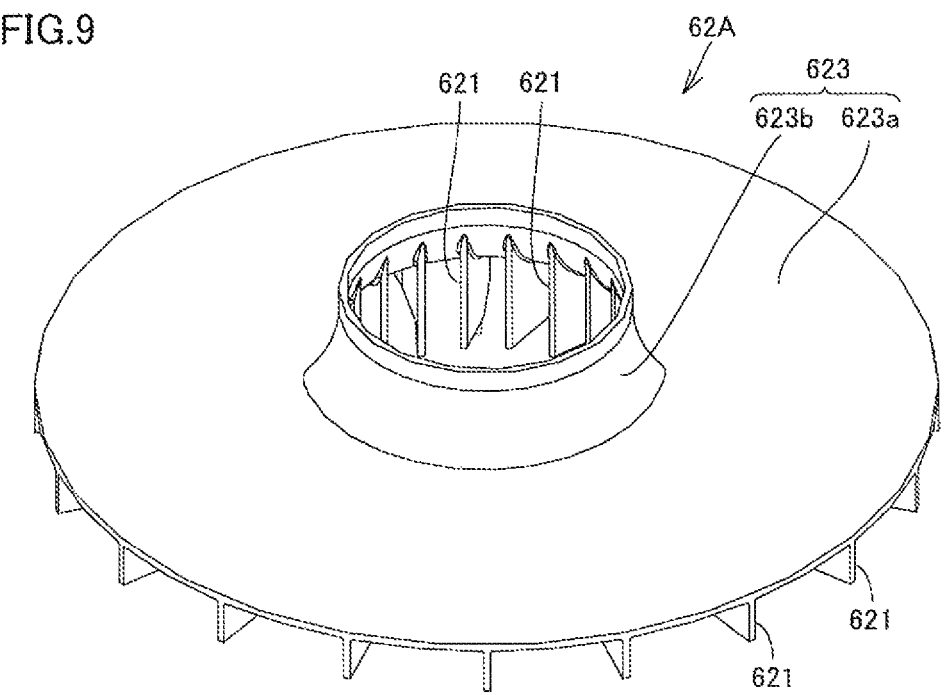
FIG. 9 is a perspective view schematically showing a constituent material of the impeller in the first embodiment.
Figure 10:
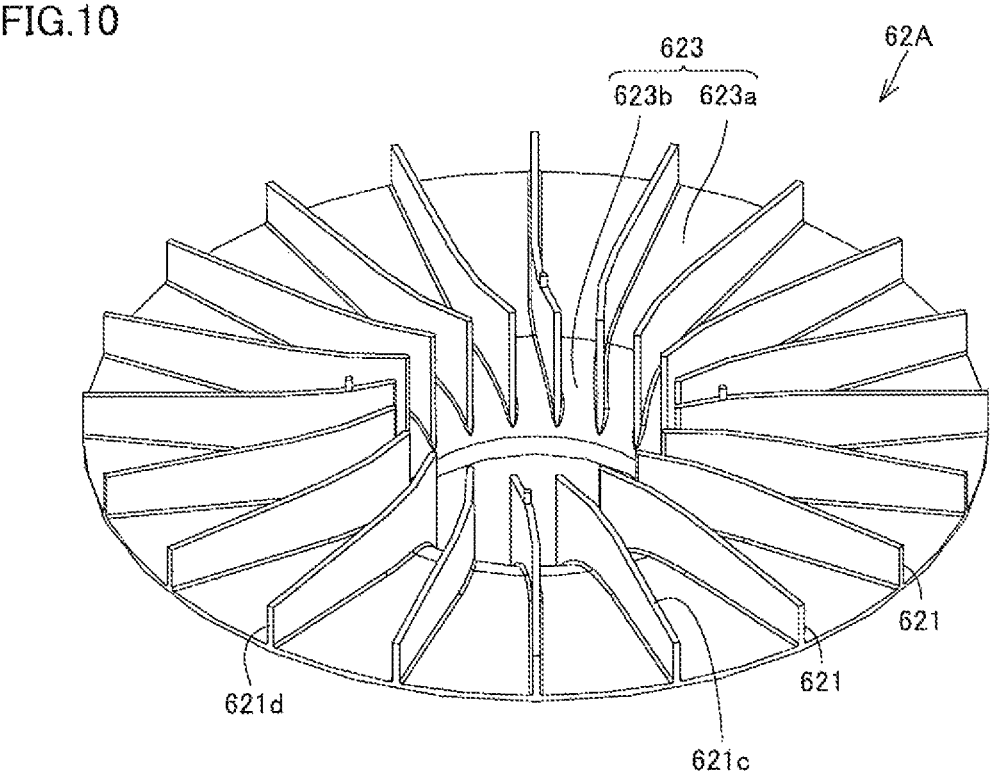
FIG. 10 is another diagram schematically showing the constituent material of the impeller shown in FIG. 9.
Figure 11:
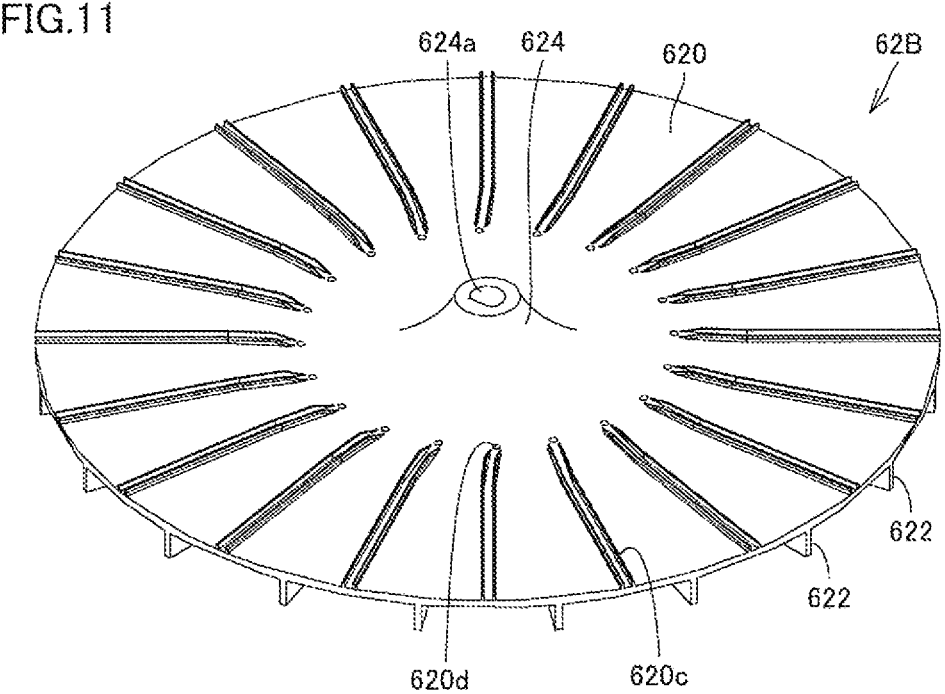
FIG. 11 is a perspective view schematically showing another constituent material of the impeller in the first embodiment.
Figure 12:
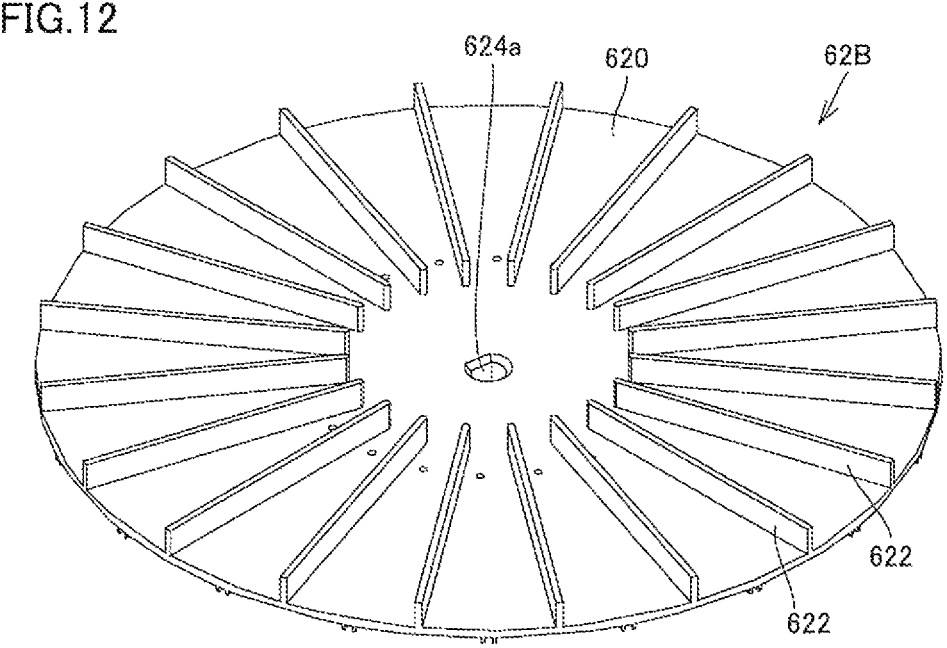
FIG. 12 is a perspective view schematically showing the constituent material of the impeller shown in FIG. 11 as seen from a different direction.

In the present embodiment, a first component 62A and a second component 62B are first produced. First component 62A is provided as an integrally molded product obtained by integrally molding shroud 623 and first blades 621 as shown in FIGS. 9 and 10. Second component 62B is provided as an integrally molded product obtained by integrally molding main plate 620, second blades 622 and boss portion 624 as shown in FIGS. 11 and 12. First component 62A and second component 62B can be produced by various known integrally molding methods and the like.

Figure 13:
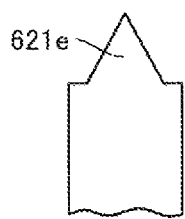
FIG. 13 is a diagram schematically showing the state of an end face of a linearly protruding region in the first blade before welding.
Figure 14:
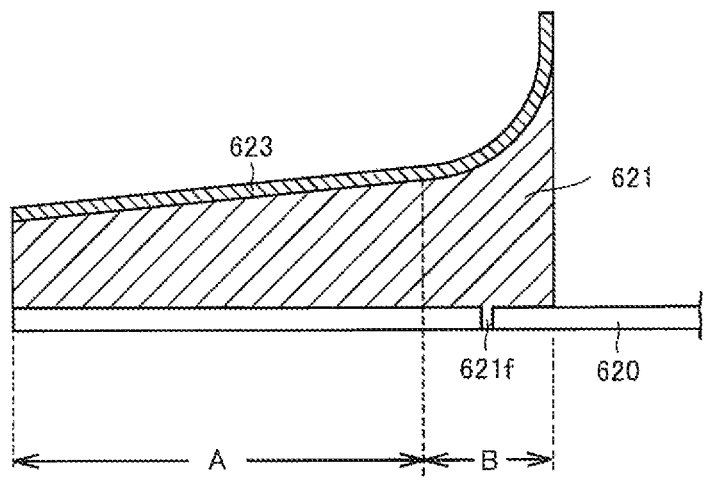
FIG. 14 is a cross-sectional view schematically showing the state where two constituent materials of the impeller are combined.

Referring to FIGS. 10, 13 and 14, in first component 62A, a positioning protrusion 621*f* is formed at an end (end face) 621*c* of the curvedly protruding region (B in FIG. 14) of first blade 621 on the side opposite to shroud 623. Referring to FIG. 13, a melt portion 621*e* is formed at end face 621*c* of the linearly protruding region welded to main plate 620. This melt portion is not formed in the curvedly protruding region that is not welded to main plate 620. Melt portion 621*e* has a triangular shape as seen from an outer circumferential side end face 621*d* of first blade 621.

Referring to FIG. 11, in second component 62B, first plane 620*a* of main plate 620 is provided with a plurality of holes 620*d* and a plurality of positioning concave portions (grooves) 620*c*. In plan view showing main plate 620 as seen from the direction orthogonal to first plane 620*a*, hole 620*d* and groove portion 620*c* each are located between second blades 622 adjacent to each other. It is to be noted that hole 620*d* may penetrate main plate 620 (see FIG. 12).

When shroud 623 is pressed by an ultrasonic welding jig and applied with ultrasonic vibration in the state where first component 62A and second component 62B are overlaid on each other such that each first blade 621 and main plate 620 come into contact with each other, each first blade 621 and main plate 620 are ultrasonic-welded to each other, thereby producing an impeller. Although details will be hereinafter described, the configuration and the like of each part are the same as those in FIG. 5, and therefore, detailed description thereof will not be repeated.

Referring to FIG. 9, the outer circumferential side of the plane of shroud 623 on the side opposite to first blade 621 (linearly inclined region 623a) has a shape linearly inclined in the radial direction so as to correspond to the shape of first blade 621. Ultrasonic welding is carried out in the state where linearly inclined region 623a is pressed by the jig produced so as to conform to the shape of this linearly inclined region 623a. It is preferable that the plane of linearly inclined region 623a on the side opposite to first blade 621 is inclined at an angle of 30° or less to main plate 620. This is because vertical ultrasonic vibration from the jig of the ultrasonic welding machine can be more stably transmitted to the weld portion when the plane is inclined in the direction closer to the horizontal direction.

Referring to FIG. 10, a plurality of end faces 621c of first blades 621 on the side opposite to shroud 623 are located in a range of one flat plane. Thereby, the plurality of end faces 621c can be brought into contact with first plane 620a of disc-shaped main plate 620 at the time of ultrasonic welding. It is to be noted that end face 621c of the curvedly protruding region of each first blade 621 can be brought into contact with main plate 620 but is not welded thereto. This is because end face 621c is neither pressed by the jig of the ultrasonic welding machine nor provided with positioning concave portion 620c of main plate 620.

Referring to FIG. 13, melt portion 621e is formed on end face 621c of the linearly protruding region that is welded to main plate 620. This melt portion is not formed in the curvedly protruding region that is not welded to main plate 620. This can further ensure that main plate 620 can be welded to the linearly protruding region of first blade 621, and also, main plate 620 can be prevented from being welded to the curvedly protruding region of first blade 621.

Melt portion 621e has a triangular shape as seen from outer circumferential side end face 621d of first blade 621. It is preferable that melt portion 621e has a triangular shape in which the angle of the apex closer the inner circumferential side is more acute. Consequently, the melt portion can be melted in a similar manner on each of the inner circumferential side and the outer circumferential side of the linearly protruding region, so that stable welding strength can be achieved.

When first component 62A and second component 62B are overlaid on each other, protrusion 621f is fitted in hole 620d provided in the first plane of main plate 620 as shown in FIG. 14. Thereby, positional misalignment of the curvedly protruding region (non-weld region) of first blade 621 can be prevented. Furthermore, the plurality of first blades 621 of first component 62A are respectively inserted into and welded to a plurality of positioning concave portions 620c of second component 62B. Thereby, the positional misalignment between main plate 620 and each first blade 621 at the time of welding can be prevented, so that welding strength can be improved.

Referring to FIGS. 11 and 12, when main plate 620 is seen from the axial direction of rotation shaft 64, each second blade 622 is placed so as to be located between two positioning concave portions 620c adjacent to each other. During ultrasonic welding, main plate 620 is placed on a jig 66 on the receiving side of the welding machine in the state where second plane 620b is located on the underside (see FIG. 15). In this case, jig 66 on the receiving side is formed in a disc shape or the like and has a size equal to or greater than the size of main plate 620. A notch portion in a slit shape is provided at the position corresponding to second blade 622. At the time of welding, main plate 620 is placed such that each second blade 622 is inserted into the notch portion of jig 66 and second plane 620b comes into contact with the main surface of jig 66 other than the notch portion. Accordingly, the notch portion of jig 66 is designed so as to be deeper than the height of second blade 622 in its protruding direction and to be larger than second blade 622. In this way, positioning concave portion 620c serving as a weld portion between main plate 620 and first blade 621 is supported by jig 66 on the receiving side of the welding machine from the second plane 620b side (underside) of main plate 620. Accordingly, ultrasonic vibration can be sufficiently transmitted to the weld portion, thereby allowing sufficient welding.

Figure 15:
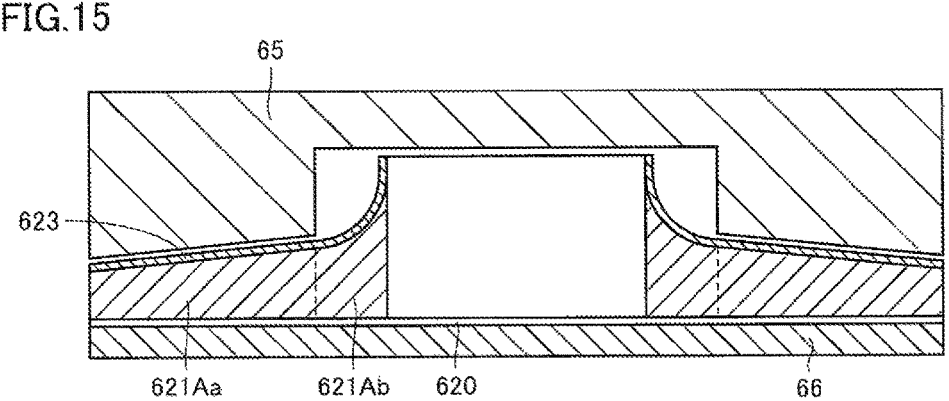
FIG. 15 is a cross-sectional view schematically showing the state at the time of welding of the main plate and the first blade according to the first embodiment.

Then, referring to FIG. 15, the state at the time of welding of main plate 620 and each first blade 621 in the present embodiment will be hereinafter described. As described above, at the time of welding of main plate 620 and each first blade 621, main plate 620 is placed such that its second plane 620b comes into contact with the upper surface of jig 66 of the welding machine. Then, first component 62A formed of first blades 621 and shroud 623 is overlaid on main plate 620 such that each first blade 621 is located on the underside, and positioned by concave portion 620c (FIG. 11), protrusion 621f (FIG. 10), hole 620d (FIG. 11) and the like. Then, jig 65 of the ultrasonic welding machine is pressed against shroud 623 from above, thereby implementing ultrasonic welding between main plate 620 and each first blade 621.

In this case, the outer circumferential portion of shroud 623 has a shape that is linearly inclined in the radial direction of main plate 620 so as to correspond to the shape of the linearly protruding region of first blade 621. Accordingly, the end face of jig 65 on the shroud 623 side can be readily processed to have a shape corresponding to the shape of linearly protruding region 621Aa of first blade 621. Then, jig 65 of the ultrasonic welding machine is pressed against this outer circumferential portion (linearly inclined region), thereby improving adhesiveness between jig 65 and shroud 623, so that ultrasonic vibration can be stably transmitted to the weld portion. Thereby, main plate 620 and linearly protruding region 621Aa of first blade 621 can be sufficiently welded.

It is to be noted that curvedly protruding region 621Ab of first blade 621 may come in contact with main plate 620 but is not welded thereto. This is because end face 621c of the curvedly protruding region of first blade 621 is a portion that is not pressed by jig 65 of the ultrasonic welding machine, and to which ultrasonic vibration in the vertical direction (in the direction perpendicular to the main plate) is hardly transmitted. Accordingly, variations in strength of welding between the main plate and first blade 621 are suppressed, so that an impeller with stable quality can be produced. Consequently, the quality of the fan can be stabilized. Even if ultrasonic welding is carried out in the state as shown in FIG. 15, there may be a possibility that curvedly protruding region 621Ab of first blade 621 and main plate 620 are partially welded to each other by propagation of ultrasonic vibration, which is however not problematic if no quality variation occurs in the fan.

Ultrasonic welding is a processing technique by which a thermoplastic resin is instantaneously melted and joined by minute ultrasonic vibration and welding pressure. Therefore, in the present embodiment, the constituent material of impeller 62 (a shroud, the first blade, a main plate, and the second blade) is made of a thermoplastic resin that is melted as a result of heating by means of ultrasonic vibration.

Then, referring to FIGS. 16 and 17, an explanation will be given with regard to a difference between a portion that is welded between main plate 620 and the linearly protruding region of first blade 621 (a weld portion) and a portion that is not welded between main plate 620 and the curvedly protruding region of first blade 621 (a non-weld portion).

Figure 16:
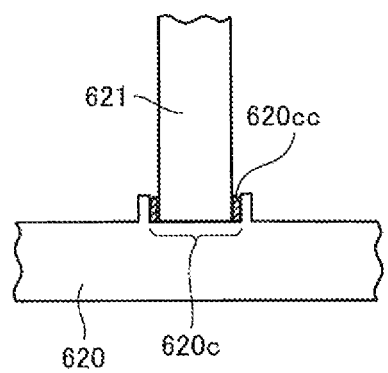
FIG. 16 is a schematic cross-sectional view of a weld portion.

FIG. 16 is a diagram showing a weld portion. As shown in FIG. 16, in the weld portion between main plate 620 and the linearly protruding region of first blade 621, a convex portion 620cc is formed with a resin melted by ultrasonic vibration or the like, for example, in positioning concave portion 620c or the like of the main plate. In this way, a portion having a shape different from the shape of the base material (main plate 620 and first blade 621) is generally formed in the weld portion between main plate 620 and first blade 621.

Figure 17:
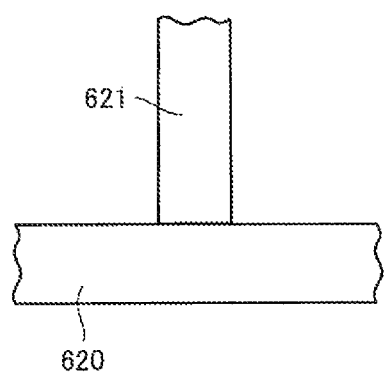
FIG. 17 is a schematic cross-sectional view of a non-weld portion.

FIG. 17 is a diagram showing a non-weld portion. As shown in FIG. 17, in the non-weld portion between main plate 620 and the curvedly protruding region of first blade 621, the resin is not melted by ultrasonic vibration or the like, but this non-weld portion is generally formed only by the shape of the base material (main plate 620 and first blade 621). In the non-weld portion, first blade 621 may or may not come in contact with main plate 620.

In this way, the weld portion and the non-weld portion can be identified also in an impeller after production.

(Functions and Effects)

The functions and effects of the present embodiment will then be described.

The impeller provided in the fan as described above: includes a linearly protruding region (a region A in FIG. 6) that is linearly increased in height from the outer circumferential side toward the inner circumferential side; and a curvedly protruding region (a region B in FIG. 6) that is curvedly increased in height from the outer circumferential side toward the inner circumferential side, this height extending in the direction in which first blade 621 protrudes from first plane 620a. The linearly protruding region is welded to main plate 620. According to this structure, the plane on the side opposite to the linearly protruding region of shroud 623 is a flat plane (a linearly inclined plane). Accordingly, by pressing the jig of the ultrasonic welding machine against this flat plane portion (see FIG. 15), the adhesiveness between the jig and shroud 623 is improved, so that ultrasonic vibration can be stably transmitted to the weld portion. Therefore, main plate 620 and first blade 621 can be sufficiently welded.

Also in the above-described impeller, the curvedly protruding region of first blade 621 is defined as a non-weld region that is not welded to main plate 620. When the curvedly protruding region is to be welded to main plate 620, it is necessary to press the jig of the ultrasonic welding machine against the curvedly inclined region of shroud 623 (a portion corresponding to the curvedly protruding region of the first blade) to transmit ultrasonic vibration. However, ultrasonic vibration cannot be sufficiently transmitted to a curved surface, thereby leading to insufficient welding or causing welding strength variations, which are therefore not preferable for a product. Accordingly, by not welding the curvedly protruding region to main plate 620, it becomes possible to produce an impeller having stable quality but not undergoing strength variations of welding between main plate 620 and first blade 621. Consequently, the quality of the fan can be stabilized.

Also in the above-described impeller, when main plate 620 is seen from the axial direction, each of second blades 622 is located between first blades 621 adjacent to each other. Thereby, when main plate 620 and each first blade 621 are ultrasonic welded (see FIG. 15), the weld portion between main plate 620 and each first blade 621 is plane-supported by jig 66 in contact with the plane between adjacent second blades 622 on the second plane side, so that the weld portion is held with stability. Accordingly, ultrasonic vibration can readily be sufficiently transmitted to the weld portion. Therefore, main plate 620 and each first blade 621 can be sufficiently welded. Particularly, in the case where second blade 622 is located at the same distance from each of two adjacent first blades 621 when main plate 620 is seen from the axial direction, main plate 620 is more stably held. Therefore, ultrasonic vibration can readily be more sufficiently transmitted to the weld portion. In addition, in the case where first blade 621 and second blade 622 are overlapped with each other when main plate 620 is seen from the axial direction, the second plane of main plate 620 cannot be supported by jig 65. Consequently, main plate 620 cannot be stably held, so that ultrasonic vibration may be less likely to be sufficiently transmitted to the weld portion.

Furthermore, when main plate 620 is seen from the axial direction, each of second blades 622 is located between first blades 621 adjacent to each other. Thereby, it becomes possible to achieve an effect of suppressing resonance between the noise generated by rotation of first blade 622 and the noise generated by rotation of second blade 622, so that the noise generated by fan 6 can be reduced.

Furthermore, when main plate 620 is seen from the axial direction of the rotation shaft, a portion including an outer circumferential end of each of the plurality of first blades 621 is disposed in the radial direction of main plate 620. This allows airflow to smoothly flow in the direction along the centrifugal force, which is caused by rotation of the impeller, in the outer circumferential portion onto which the centrifugal force is greatly exerted. Consequently, the weld portion is less likely to come off. As long as the above-described effect can be achieved, the linearly protruding region of first blade 621 may be somewhat deviated from the radial direction when main plate 620 is seen from the axial direction of the rotation shaft.

Furthermore, when main plate 620 is seen from the axial direction of the rotation shaft, a portion including the outer circumferential end of each of the plurality of second blades 622 is disposed in the radial direction of main plate 620. Accordingly, when main plate 620 is seen from the axial direction of the rotation shaft, each second blade 622 can be readily disposed so as to be located between two first blades 621 adjacent to each other. As long as the above-described effect can be achieved, second blade 622 may be somewhat deviated from the radial direction when main plate 620 is seen from the axial direction of the rotation shaft.

Furthermore, referring to FIGS. 7 and 8, the number of first blades 621 is the same as the number of second blades 622 in the present embodiment, but the numbers thereof are not limited thereto. However, if the number of first blades 621 is different from the number of second blades 622, it is preferable that the number of second blades 622 is a sub-multiple of the number of first blades 621. It is preferable that such number of first blades 621 and second blades 622 are provided such that first blades 621 are arranged at regular intervals so as to be symmetrical with respect to the rotation shaft while second blades 622 are arranged at regular intervals so as to be symmetrical with respect to the rotation shaft. Thereby, the air-blowing performance of the fan is stabilized.

Furthermore, the length of second blade 622 in the radial direction is not particularly limited, but preferably equal to or greater than half of the length of first blade 621 in the radial direction, and more preferably equal to or greater than the length of the linearly protruding region of first blade 621. Even when the pressure within fan case 61 is particularly raised for some reasons, there hardly occurs such a situation that the balance is disturbed to one side to cause backflow to occur only on the second blade 622 side.

Furthermore, in the present embodiment, the height of second blade 622 is equal to or less than the height of first blade 621, and preferably equal to or less than half of the height of first blade 621. When the height of second blade 622 is increased, the air-blowing performance of first blade 621 is lowered, and also, excessively incoming air may exert an influence upon the flow of the combustion gas. In addition, in impeller 62 of the present embodiment, the height of second blade 622 is fixed in a range from the outer circumferential side to the inner circumferential side, but not limited thereto.

Furthermore, in water heater 100 of the present embodiment, by the air-blowing capability of first blade 621, combustion gas can be suctioned from box main body 5a of exhaust box 5 through fan connection portion 5b into fan case 61. In other words, in water heater 100 of the present embodiment, by means of rotation of impeller 62, the combustion gas within exhaust box 5 is suctioned into the inner circumferential side of first plane 620a of impeller 62 and emitted to the outer circumferential side thereof (see hollow arrows in FIG. 3). This allows the fan to exert the air-blowing capability for causing the combustion gas of water heater 100 to flow from the downstream to the upstream.

Furthermore, in water heater 100 of the present embodiment, the air outside the fan case 61 can be suctioned into fan case 61 by the air-blowing capability of second blade 622. In other words, in water heater 100 of the present embodiment, by rotation of impeller 62, the air outside the fan case 61 is suctioned through the through hole 61c into fan case 61, and further emitted from the inner circumferential side toward the outer circumferential side of second plane 620b (see black arrows in FIG. 3). Accordingly, drive source 63 can be cooled.

Furthermore, by the air-blowing capability of second blade 622, resistance pressure resisting the flow of gas moving from the outer circumferential side to the inner circumferential side of second plane 620b is generated in gap 65c between back surface wall 61a and impeller 62. In other words, water heater 100 of the present embodiment allows resistance pressure to be kept so as to resist the flow of the combustion gas that is to flow from the inside to the outside of fan case 61 (backflow). Therefore, according to the water heater of the present invention, when the pressure inside fan case 61 is increased due to factors such as blockage of exhaust tube 7, backflow of the combustion gas can be suppressed.

Furthermore, the water heater of the present embodiment is a water heater of a latent heat recovery type capable of heating water by recovering latent heat of combustion gas. In this case, since acid drainage water is produced by recovery of latent heat, it is particularly useful to provide a highly durable impeller that is capable of resisting acid drainage water.

Particularly, in the water heater of the present embodiment, the above-described fan is attached such that the shroud side is located on the side closer to the burner. The opening of the fan case is provided on the underside in order to allow the rising combustion gas to be suctioned therethrough, and the impeller is placed such that its shroud side is located on this opening side (underside). Accordingly, drainage water is more likely to accumulate in the boundary portion existing between shroud 623 and first blade 621 and corresponding to the upper surface side of shroud 623. Thus, shroud 623 and each first blade 621 are integrally formed, and main plate 620 and each first blade 621 (integrally formed with shroud 623) are welded, so that a weld portion with low durability is located on the underside of main plate 620 (on the burner side). Thereby, the weld portion is less likely to be exposed to drainage water, with the result that the weld portion can be protected from corrosion caused by drainage water. Consequently, it becomes possible to provide a water heater including a highly durable fan that can resist a high temperature environment.

It is preferable that the impeller is made of a thermoplastic resin having acid resistance. This allows further improvement in fan durability against drainage water produced by recovery of latent heat.

Examples of the thermoplastic resin having acid resistance may be polyphenylene sulfide (PPS), syndiotactic polystyrene (SPS), polyvinyl chloride (PVC), silicone resin, fluororesin such as polytetrafluoroethylene, unsaturated polyester resin, polycarbonate resin, methacrylstyrene (MS) resin, methacryl resin, AS resin (styrene acrylonitrile copolymer), ABS resin (acrylonitrile, butadiene, styrene copolymerization synthetic resin), phenol resin, epoxy resin, melamine resin, polyethylene, polypropylene, polystyrene, and polyethylene terephthalate (PET).

For the same reason, it is preferable that other members such as fan case 61, exhaust box 5, and exhaust tube 7 each are made of a material having acid resistance.

Furthermore, in the present embodiment, since water heater 100 of the exhaust suction and combustion type is employed as described above in the present embodiment, a combustion operation by burner 2 can be stabilized as compared with a water heater of what is called a forced exhaust type even though exhaust tube 7 is decreased in diameter, which will be described below.

In a water heater of what is called a forced exhaust type, a fan, a burner, a primary heat exchanger, and a secondary heat exchanger are arranged in this order from upstream to downstream in a flow of a combustion gas. Namely, the combustion gas produced in the burner is caused to flow into an exhaust tube outside the water heater by the fan through the primary heat exchanger and the secondary heat exchanger.

The combustion gas forced out of the fan receives flow path resistance produced by the primary heat exchanger and the secondary heat exchanger before it reaches the exhaust tube. Therefore, a pressure with which the combustion gas is sent immediately before the exhaust tube is lower by magnitude comparable to this flow path resistance. Therefore, in order to force the combustion gas into the exhaust tube smaller in diameter, a fan blow pressure should be raised. When a fan blow pressure is raised, however, an internal pressure within a burner case becomes higher. Therefore, when a supply pressure of the combustion gas supplied to the burner is low, a combustion operation becomes unstable.

In contrast, according to the exhaust suction and combustion type in the present embodiment, burner 2, primary heat exchanger 3, secondary heat exchanger 4, and fan 6 are arranged in this order from upstream to downstream in the flow of the combustion gas. With this type, since a pressure is negative on the upstream side of fan 6, a blow pressure by fan 6 does not have to be raised. Thus, since an internal pressure within the burner case can be maintained low even though exhaust tube 7 is decreased in diameter, a combustion operation can be stabilized even when a supply pressure of the combustion gas supplied to burner 2 is low.

In addition, although an example using ultrasonic welding as a welding method has been described in the present embodiment, vibration welding or thermal welding can be employed in addition to ultrasonic welding.

Second Embodiment

Figure 18:
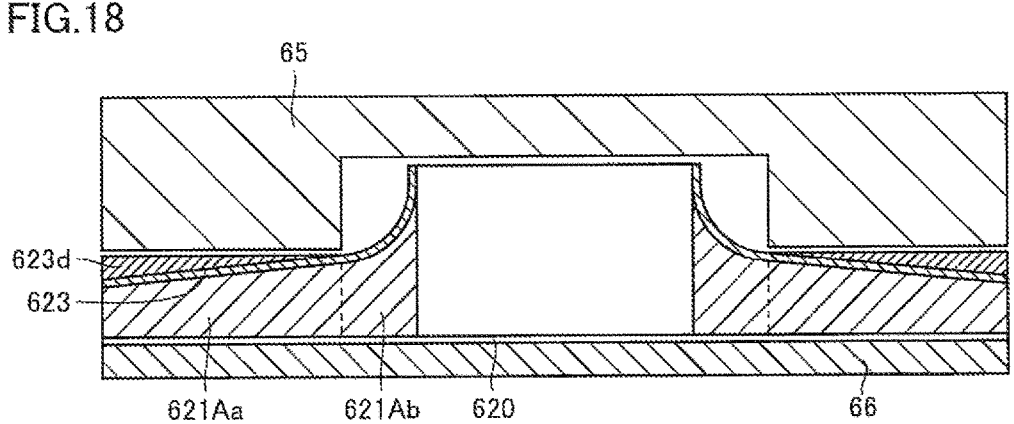
FIG. 18 is a cross-sectional view schematically showing the state at the time of welding of the main plate and the first blade in the second embodiment.

Referring to FIG. 18, the present embodiment is different from the first embodiment in that a thickened portion 623d is provided on the plane of shroud 623 on the side opposite to first blade 621. Since the features other than the above are the same as those in the first embodiment, description thereof will not be repeated.

The plane of thickened portion 623d on the side opposite to first blade 621 is horizontal to main plate 620. Accordingly, in the present embodiment, ultrasonic vibration in the vertical direction (the direction perpendicular to the main plate) can be more stably transmitted to the weld portion, so that the weld portion can be more sufficiently welded.

In addition, it is preferable that thickened portion 623d is provided in a portion overlapped with first blade 621 as seen from the direction of the rotation shaft. For the purpose of improving the adhesiveness to the jig of the ultrasonic welding machine so as to allow ultrasonic vibration to be readily transmitted, it is preferable that thickened portion 623d is provided over the entire circumference of shroud 623.

Third Embodiment

Figure 19:
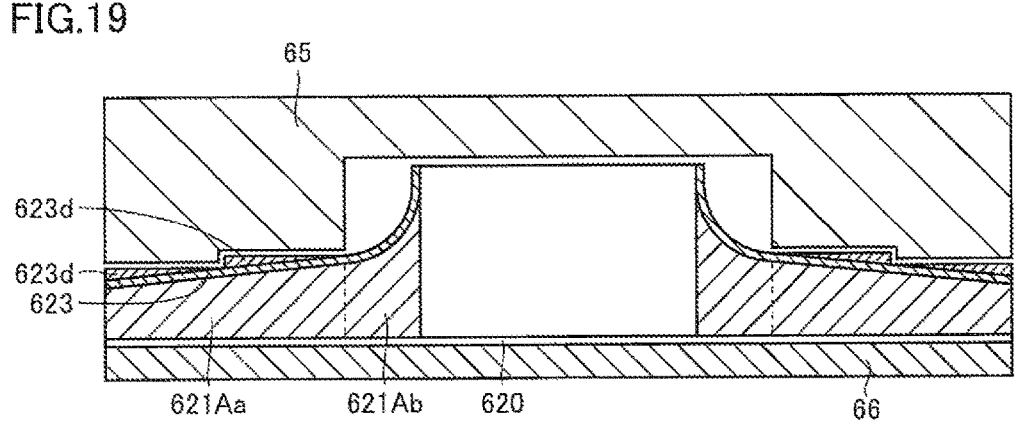
FIG. 19 is a cross-sectional view schematically showing the state at the time of welding of the main plate and the first blade in the third embodiment.

Referring to FIG. 19, the present embodiment is different from the second embodiment in that thickened portion 623d consists of two portions. Since the features other than the above are the same as those in the second embodiment, description thereof will not be repeated. In addition, the plane of each thickened portion 623d on the side opposite to first blade 621 is horizontal to main plate 620.

In the present embodiment, the impeller can be reduced in weight than the impeller in the second embodiment while achieving the effects similar to those in the second embodiment.

Fourth Embodiment

The present embodiment is different in configuration of the impeller from the first embodiment, but other configurations are the same as those in the first embodiment. Accordingly, the same description as that in the first embodiment will not be repeated.

(Configuration)

Figure 20:
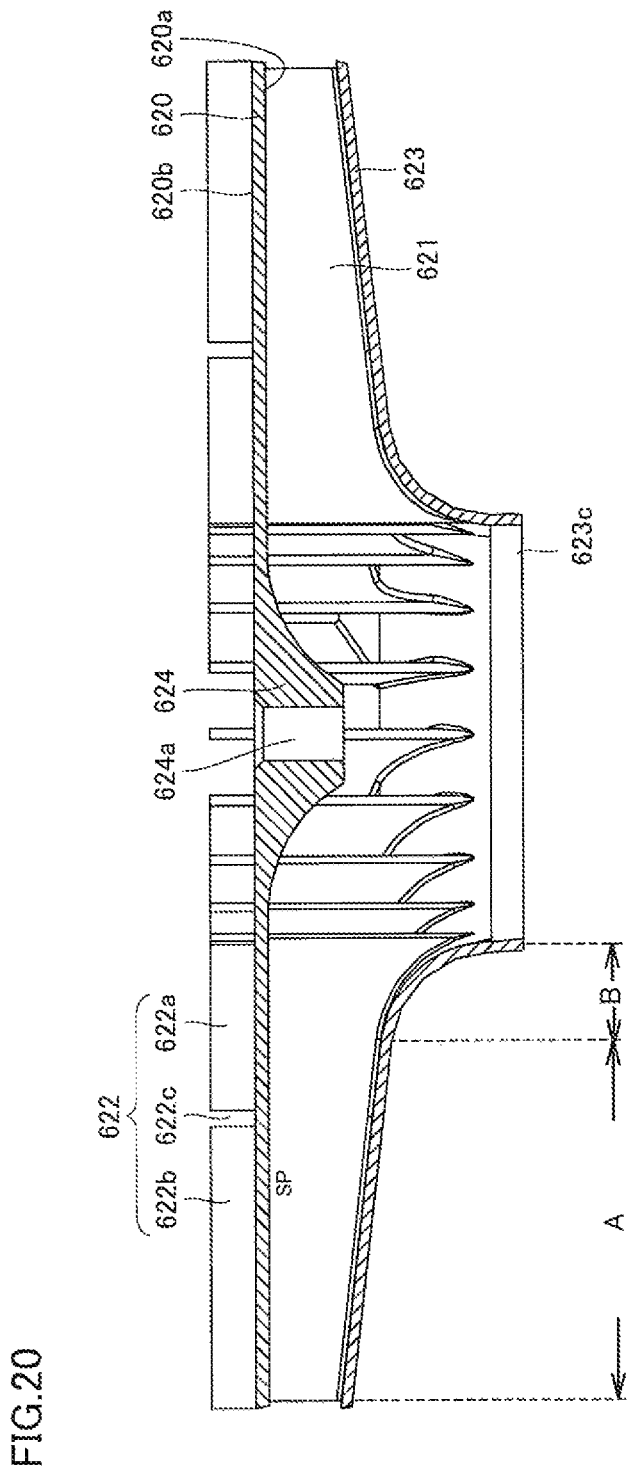
FIG. 20 is a cross-sectional view schematically showing the configuration of an impeller in the fourth embodiment.

Referring mainly to FIG. 20, impeller 62 mainly has a disc-shaped main plate 620, a plurality of first blades 621, a plurality of second blades 622, a shroud 623, and a boss portion 624. First blades 621, shroud 623, and boss portion 624 are the same as those in the first embodiment.

Figure 21:
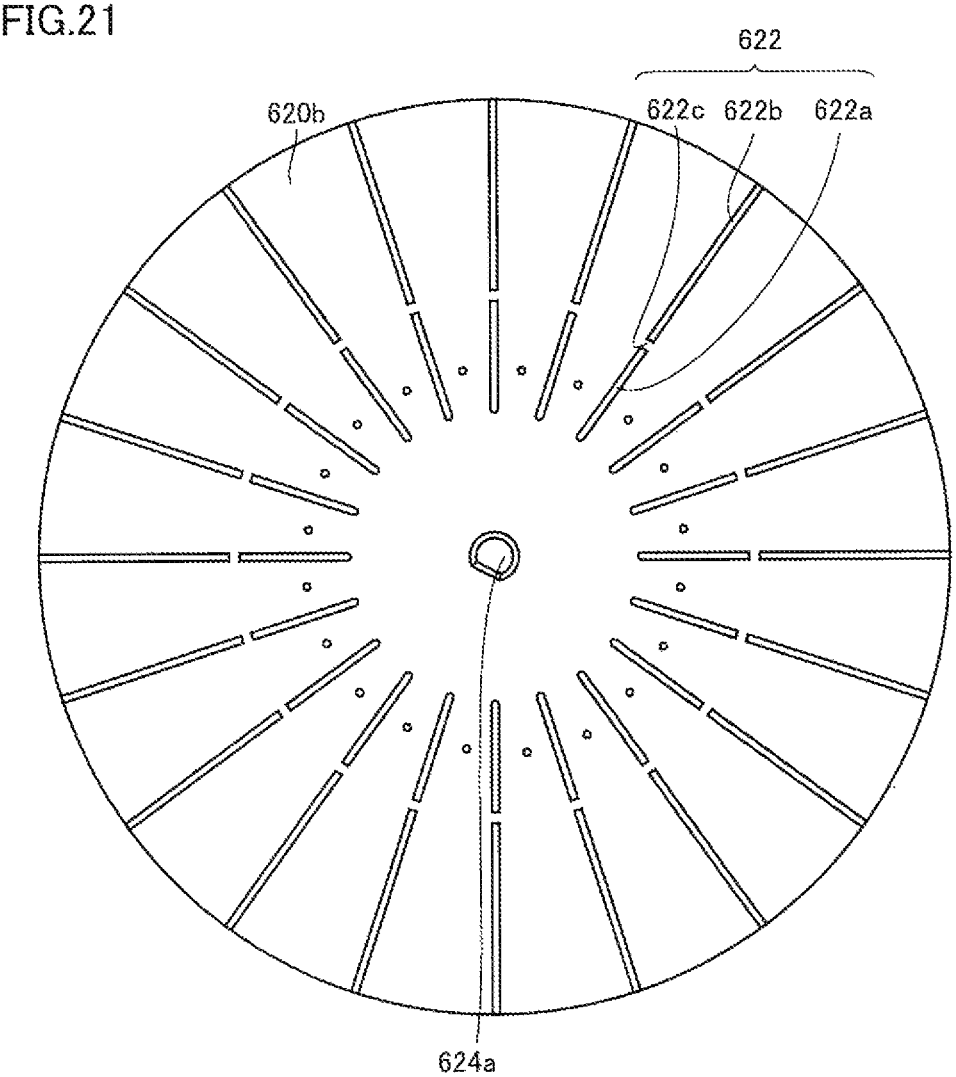
FIG. 21 is a plan view schematically showing the impeller in the fourth embodiment in plan view as seen from the direction orthogonal to the second plane of the main plate.

Referring mainly to FIGS. 20 and 21, second blades 622 each are formed so as to extend from the inner circumferential side to the outer circumferential side of second plane 620b and also to protrude from second plane 620b. Second blades 622 are separately provided on second plane 620b and do not come in contact with each other. In the present embodiment, second blade 622 is fixed in height and extends in the direction along the radial direction of main plate 620.

Each second blade 622 is separated by a slit 622c into an inner blade member 622a located on the inner circumferential side of second plane 620b and an outer blade member 622b located on the outer circumferential side of second plane 620b. The width of slit 622c (the distance between the ends of inner blade member 622a and outer blade member 622b facing each other) is not particularly limited. If this width is too large, however, the length of the blade becomes too short, so that the function of second blade 622 may deteriorate. Accordingly, the width of the slit is preferably narrow.

In the present embodiment, a resin containing a fibrous filler is used as a material forming first component 62A and second component 62B. A glass fiber can be used as a fibrous filler. Furthermore, a thermoplastic resin having acid resistance can be used as a resin. A thermoplastic resin having acid resistance is the same as the resins mentioned in the first embodiment.

Impeller 62 of the present embodiment can be produced by welding: the first component including first blades 621 and shroud 623; and the second component including main plate 620, second blades 622, and boss portion 624, as described above.

(Functions and Effects)

The functions and effects of impeller 62 according to the present embodiment will be hereinafter described.

Second component 62B provided as one of components of impeller 62 and including disc-shaped main plate 620 and a plurality of second blades 622 can be produced as described below.

First prepared is a molding die having a disc-shaped first internal space (corresponding to the shape of the main plate) and a plurality of second internal spaces protruding from the first internal space (corresponding to the shape of the second blade). Then, a resin containing a fibrous filler is injected in so as to flow while spreading from the center side of the molding die (the center side of the first internal space) toward the outside thereof (the outer circumferential side of the first internal space). Then, this resin is cured.

During curing of the resin, this resin tends to shrink. Particularly when a disc-shaped component is produced using a resin, the resin tends to shrink more in the radial direction. Accordingly, in order to improve the flatness of disc-shaped main plate 620 after curing, the resin injected into the first internal space is required to evenly shrink in the radial direction.

As to the resin injected into the above-described molding die, the filler in the resin injected into the disc-shaped first internal space is more likely to spread, whereas the filler in the resin injected into the second internal space is more likely to be oriented in the direction in which the second internal space extends. This is because the first internal space extends so as to cause the flow of resin to randomly spread, whereas the second internal space is arranged so as to cause the resin to flow only in a certain direction (the direction in which the second internal space extends).

If a slit is not provided in second blade 622 extending in the radial direction of main plate 620, the second internal space is formed in a slit shape that linearly extends in the radial direction of the disc-shaped first internal space. In other words, the filler oriented in the second internal space is to linearly extend in the radial direction of the first internal space.

In this case, the filler oriented in the second internal space (the filler oriented in second blade 622) acts to strongly resist radial shrinkage of the resin within the first internal space (the resin forming main plate 620). This is because the filler oriented in the second internal space acts as a tension rod against radial shrinkage of the resin within the first internal space.

When strong resistance occurs against radial shrinkage of the resin within the first internal space, it becomes difficult to cause the resin forming main plate 620 to shrink in the radial direction evenly in the portion having second blade 622 and in the portion not having second blade 622. Consequently, the resulting main plate 620 is to have low flatness. If the flatness of main plate 620 is low, fixation of components 62A and 62B using a jig becomes unstable at the time of ultrasonic welding. Accordingly, ultrasonic vibration cannot be stably transmitted to the weld portion, with the result that the welding performance between each first blade 621 and first plane 620a of main plate 620 is decreased.

If first blade 621 and main plate 620 are not sufficiently welded, the durability of the impeller formed by welding first component 62A and second component 62B is decreased. Furthermore, the impeller having a main plate with low flatness exhibits low motion balance performance, thereby generating vibration and noise, so that stable air-blowing performance cannot be exhibited.

In contrast, according to impeller 62 in the present embodiment, second blade 622 extending in the radial direction of main plate 620 is separated by slit 622c into inner blade member 622a located on the inner circumferential side of second plane 620b and outer blade member 622b located on the outer circumferential side of second plane 620b.

In this case, since the second internal space in a molding die is shaped so as to be divided into two sections in the radial direction of the first internal space, the filler oriented in the second internal space has less effect as a tension rod in comparison with the above-described case. In other words, resistance by the filler oriented in second blade 622 against radial shrinkage of the resin can be reduced.

Therefore, according to impeller 62 of the present embodiment, uneven shrinkage of main plate 620 in the radial direction caused by existence of second blade 622 can be suppressed. Thereby, the flatness of main plate 620 can be increased, thereby allowing second component 62B including main plate 620 and second blade 622 to be sufficiently welded to another component (first component 62A), so that excellent durability and strength can be achieved while stable air-blowing performance can be exhibited.

In impeller 62 described above, when slit 622c is provided at a position on the outer circumferential side with respect to the position at one half of the radius of main plate 620, the function as a tension rod described above can be effectively reduced, so that the flatness of main plate 620 can be further improved. This is because when the resin injected into the disc-shaped internal space shrinks, the resin shrinks more on the outer circumferential side of the disc than on the inner circumferential side thereof, in which case the resistance caused by the filler oriented in the radial direction exerts a large influence.

However, if slit 622c is provided at a position on the side excessively close to the outer circumferential side, inner blade member 622a is increased in length, so that the above-described resistance tends to be increased. Accordingly, it is preferable that the position of slit 622c in the radial direction is set on the inner circumferential side at a distance of one third or more of the radius from the external end of main plate 620.

Furthermore, in impeller 62 as described above, when slit 622c is provided at a position on the inner circumferential side with respect to the position at one half of the radius of main plate 620, deterioration of the air-blowing capability of second blade 622 can be suppressed. This is because the influence of the air-blowing capability of second blade 622 is remarkably exerted more on the outer circumferential side of second blade 622 than on the inner circumferential side thereof.

However, if slit 622c is provided on the side excessively close to the inner circumferential side, outer blade member 622b is increased in length, so that the above-described resistance tends to increase. Accordingly, it is preferable that the position of slit 622c in the radial direction is set on the outer circumferential side at a distance of one third or more of the radius from the center of main plate 620.

Furthermore, in impeller 62 as described above, first blade 621 and shroud 623 are also integrally molded by a resin containing a fibrous filler. Accordingly, first component 62A and second component 62B each can be improved in strength by containing a fibrous filler. Furthermore, when first component 62A and second component 62B are formed using the same material, ultrasonic vibration at the time of welding can be further evenly transmitted.

Furthermore, a resin containing a fibrous filler is used for the material of impeller 62 and also the components forming impeller 62 can also be sufficiently welded, so that the fan can be improved in durability and strength and can exhibit stable air-blowing performance Fifth Embodiment The present embodiment is different in configuration of the impeller, particularly in configurations of the second impeller and the main plate, from the fourth embodiment, and other configurations are the same as those in the fourth embodiment. Accordingly, the same description will not be repeated.

(Configuration)

Figure 22:
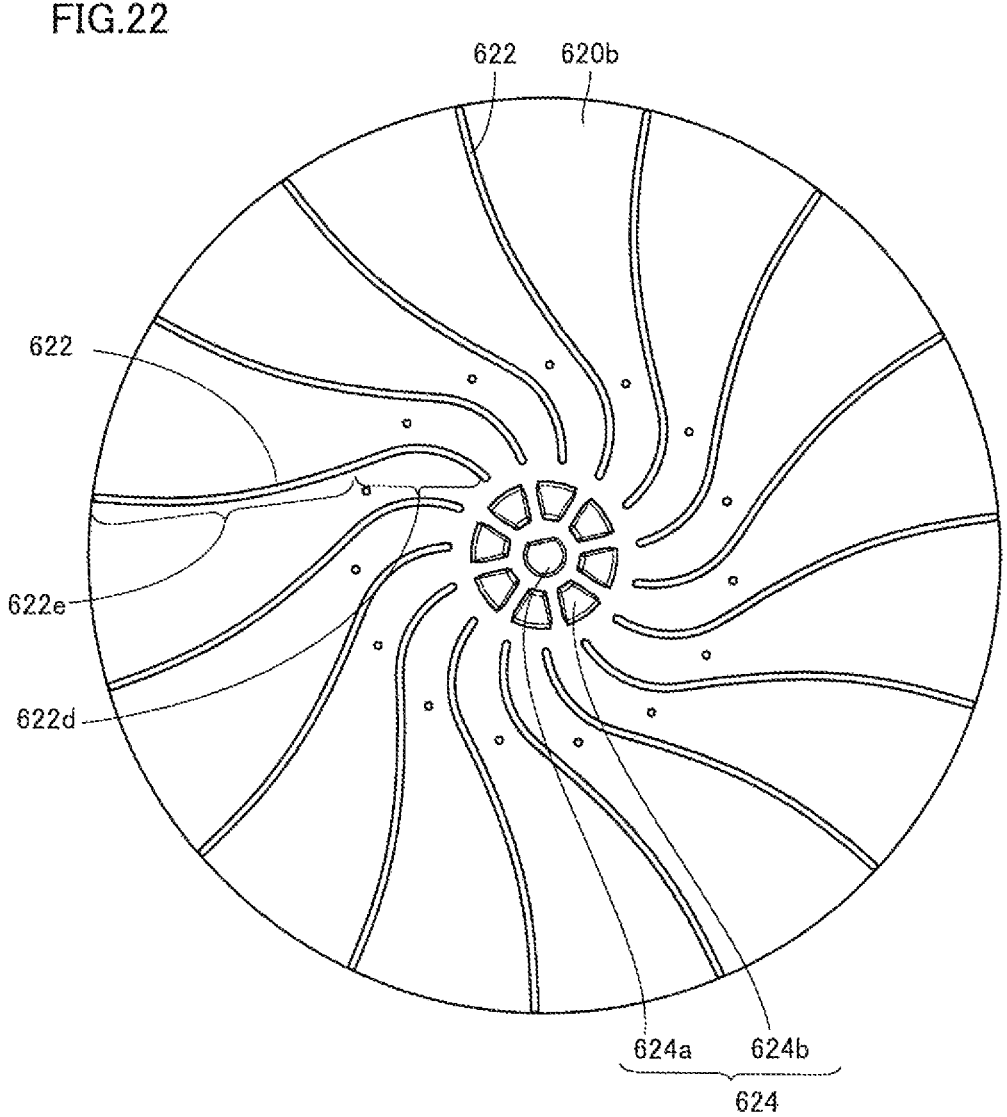
FIG. 22 is a plan view schematically showing an impeller in the fifth embodiment in plan view as seen from the direction orthogonal to the second plane of the main plate.

Referring mainly to FIG. 22, second blades 622 each are formed so as to extend from the inner circumferential side to the outer circumferential side of second plane 620b and also to protrude from second plane 620b. Second blades 622 are separately provided on second plane 620b and do not come in contact with each other. Furthermore, each second blade 622 is fixed in height and crosses the radial direction of main plate 620.

In plan view as seen from the direction orthogonal to second plane 620b of main plate 620, each second blade 622 is formed in a curved line including: a first curved portion 622d located on the inner circumferential side of second plane 620b and having a relatively small radius of curvature; and a second curved portion 622e located on the outer circumferential side of second plane 620b, extending continuously to first curved portion 622d, and having a relatively large radius of curvature. Furthermore, the direction in which first curved portion 622d is curved is different from the direction in which second curved portion 622e is curved, and second blade 622 is formed entirely in an S-shape.

Figure 23:
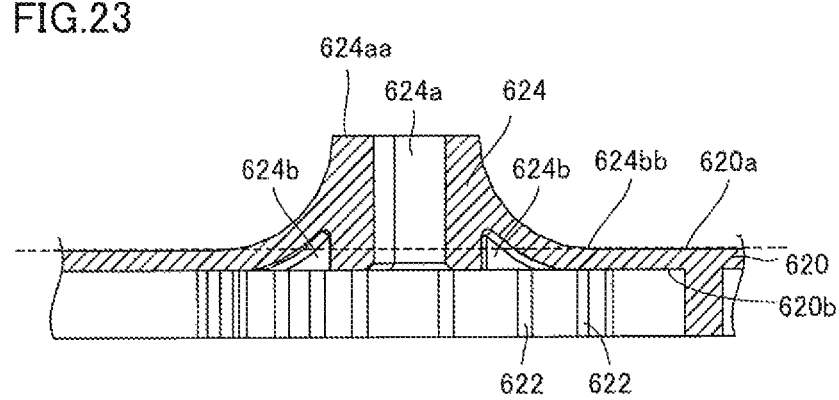
FIG. 23 is a partial cross-sectional view schematically showing the configuration of the impeller in the fifth embodiment.

Referring mainly to FIGS. 22 and 23, boss portion 624 is formed so as to be continuously increased in size from an end portion 624aa of the boss portion toward an uprising portion 624*bb* that extends from first plane 620*a* of boss portion 624. Furthermore, a plurality of thinned portions 624*b* are provided in boss portion 624 on the second plane 620*b* side so as to surround bearing hole 624*a*.

In this case, end portion 624*aa* means an end of boss portion 624 located at a height that is farthest away from first plane 620*a*. Furthermore, uprising portion 624*bb* means a position at which the height level of the surface of first plane 620*a* is started to change with respect to the tangent line of the flat plane of first plane 620*a* of main plate 620 (a dotted line in FIG. 23). Furthermore, the expression that "boss portion 624 is formed so as to be continuously increased in size" means that the outer shape of the cross-section of the boss portion shown in FIG. 23 is continuously increased.

(Functions and Effects)

impeller 62 in the present embodiment, second blade 622 extends so as to cross the radial direction of main plate 620.

In this case, in a molding die for producing second component 62B, the second internal space corresponding to second blade 622 has a shape that crosses the radial direction of the first internal space corresponding to main plate 620. This leads to a reduction in function of the filler oriented in the second internal space as a tension rod in comparison with the case where the second internal space linearly extends in the radial direction of the first internal space. In other words, the resistance by the filler oriented in second blade 622 against radial shrinkage of the resin can be reduced.

Therefore, according to impeller 62 of the present embodiment, uneven shrinkage of main plate 620 in the radial direction caused by existence of second blade 622 can be suppressed. Consequently, since the flatness of main plate 620 can be improved, second component 62B including main plate 620 and each second blade 622 can be sufficiently welded to another component (first component 62A). Therefore, excellent durability and strength can be achieved while stable air-blowing performance can be exhibited.

Furthermore, in the present embodiment, in order to increase the strength, boss portion 624 is formed so as to be continuously increased in size from end portion 624*aa* of the boss portion toward uprising portion 624*bb* that extends from first plane 620*a* of boss portion 624.

In this case, when a thinned portion is not provided in boss portion 624 on the second plane 620*b* side, the thickness of the resin forming a portion near uprising portion 624*bb* of boss portion 624 is to be greater than the thickness of the resin forming a portion near end portion 624*aa* of boss portion 624 and the thickness of the resin forming main plate 620.

In this case, the time required for the resin near uprising portion 624*bb* to completely cure is longer than the time required for the resin in other portions to completely cure. When the time required for curing is different in each part of boss portion 624, anisotropy occurs in shrinkage of resin, with the result that a distortion occurs in boss portion 624 and its surrounding area.

In contrast, according to the present embodiment, a thinned portion is provided in boss portion 624 on the second plane 620*b* side. Thereby, the resin forming a portion near uprising portion 624*bb* of boss portion 624 and the resin forming a portion near end portion 624*aa* of boss portion 624 can be provided to have a similar thickness as compared with the case where a thinned portion is not provided. Accordingly, the distortion as described above can be suppressed.

Therefore, according to boss portion 624 provided in impeller 62 of the present embodiment, strength can be improved while a distortion in the boss portion can be suppressed.

The present embodiment described above in greater detail is not limited to the above-described manner For example, in FIG. 22, second blade 622 is formed entirely in a curved line, but second blade 622 may be formed in a linear shape and provided so as to cross the radial direction of main plate 620. Furthermore, a part of second blade 622 may be formed in a curved line. Also in this case, the same effects as those described above can be achieved.

However, if the extending direction of second blade 622 deviates greatly from the radial direction of main plate 620, the air-blowing force of second blade 622 is decreased. Accordingly, as in the second embodiment, it is preferable that second blade 622 has an S-shape in a plan view showing main plate 620 as seen from the direction orthogonal to second plane 620*b*. In this case, deviation of second blade 622 from the radial direction of main plate 620 can be reduced while second blade 622 is entirely formed in a curved line.

Particularly, when the radius of curvature of second curved portion 622*e* of second blade 622 that is located on the outer circumferential side is relatively small, the air-blowing force of second blade 622 can be maintained high. This is because the shape of second blade 622 on the outer circumferential side exerts a great influence upon the air-blowing force.

When second blade 622 is formed in an S-shape, a preferable radius of curvature can be determined based on the diameter of main plate 620. For example, when the diameter of main plate 620 is 150 mm, the radius of curvature of first curved portion 622*d* is preferably about 16 mm while the radius of curvature of second curved portion 622*e* is preferably about 80 mm.

Figure 24:
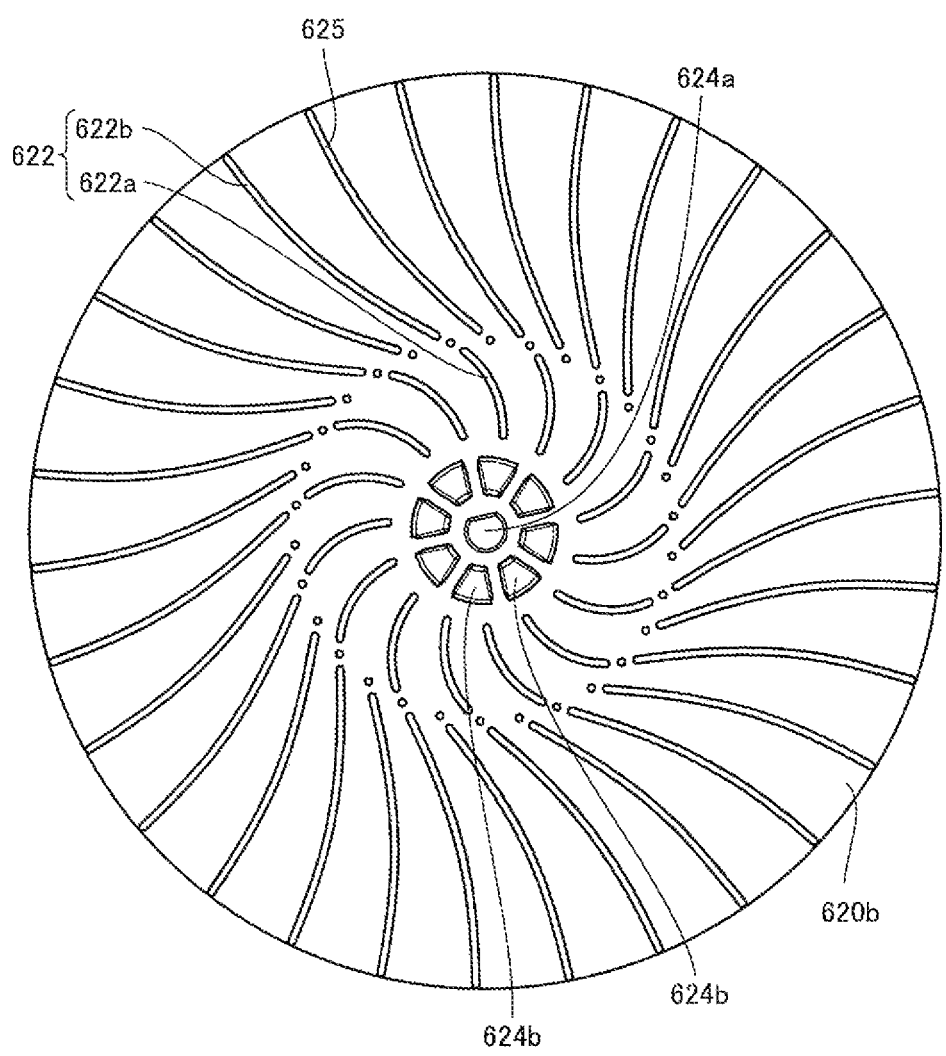
FIG. 24 is a plan view schematically showing another configuration of the impeller in the fifth embodiment in plan view as seen from the direction orthogonal to the second plane of the main plate.
Figure 25:
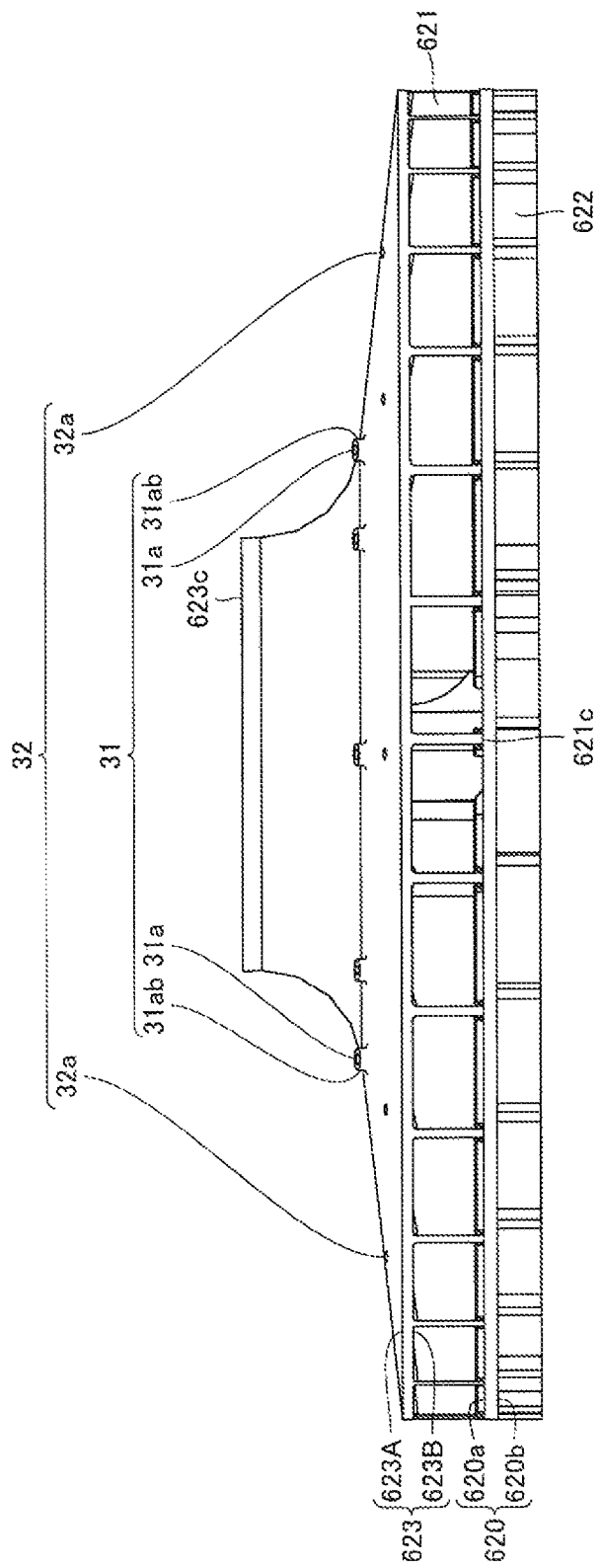
FIG. 25 is a side view schematically showing the configuration of an impeller in the sixth embodiment.
Figure 26:
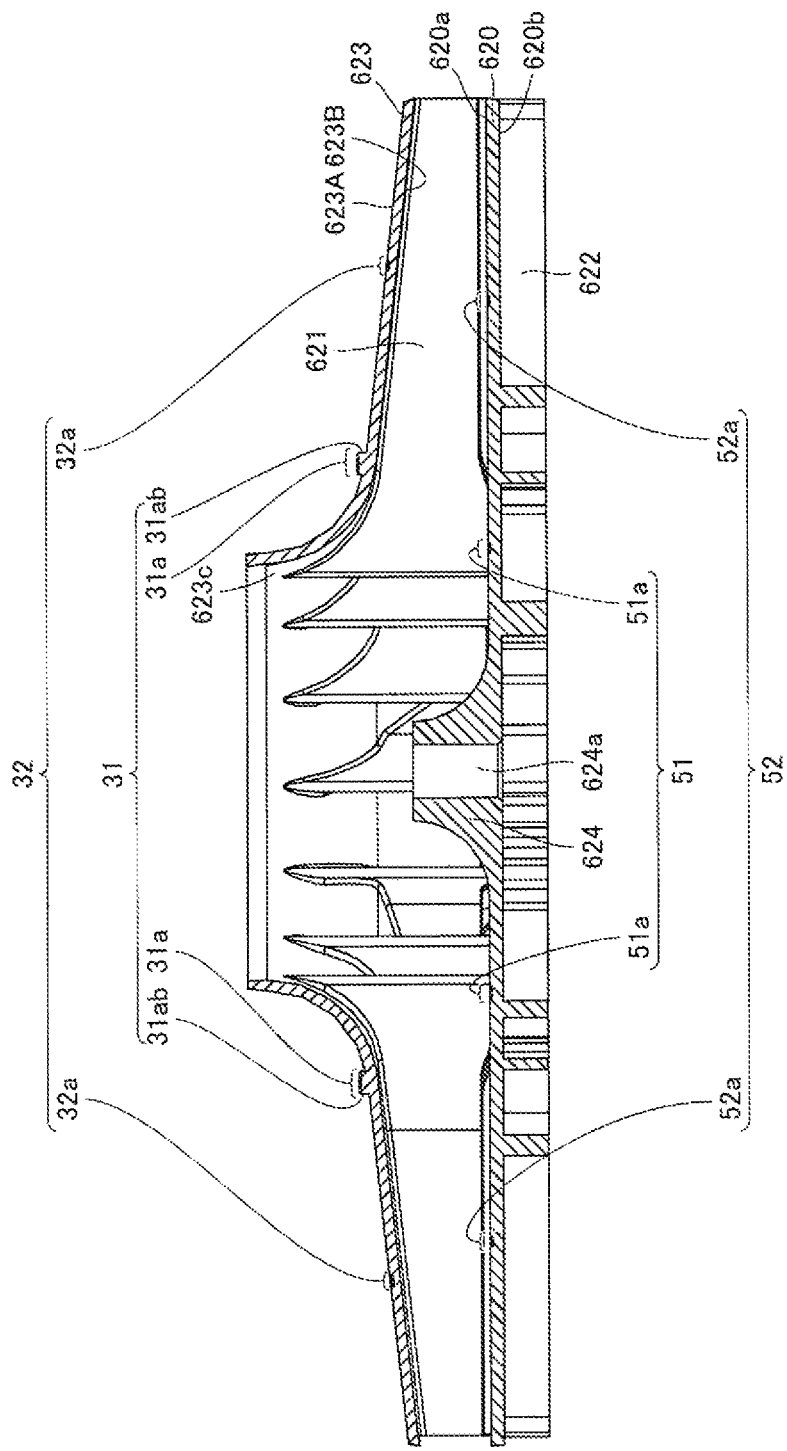
FIG. 26 is a cross-sectional view schematically showing the configuration of the impeller in the sixth embodiment.
Figure 27:
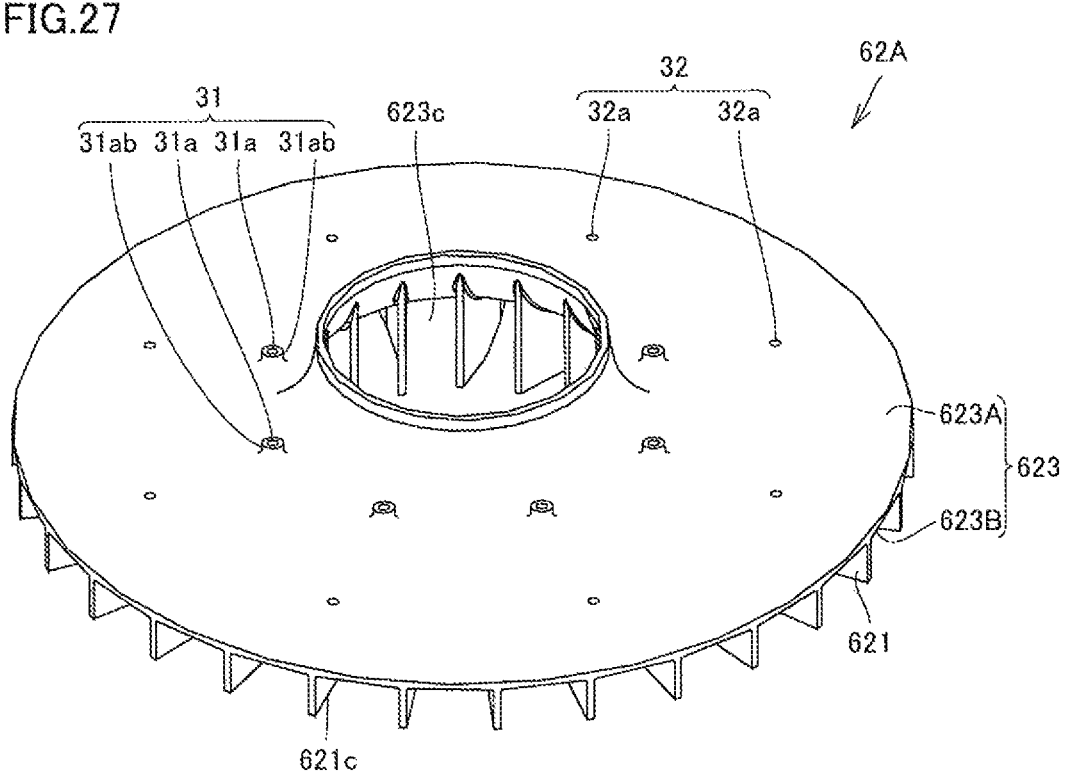
FIG. 27 is a perspective view schematically showing the configuration of the first member of the impeller in the sixth embodiment.

Furthermore, as shown in FIG. 24, second blade 622 having an S-shape may be separated by a slit into inner blade member 622*a* and outer blade member 622*b*. In this case, the flatness of main plate 620 can be further improved.

Furthermore, as shown in FIG. 24, a third blade 625 extending from the inner circumferential side to the outer circumferential side of second plane 620*b* may be provided between outer blade members 622*b*. In this case, in addition to the air-blowing force of second blade 622, the air-blowing force of third blade 625 can be exerted on the second plane 620*b* side of main plate 620. Therefore, the effect of cooling drive source 63 and the effect of preventing backflow of combustion gas can be improved.

As shown in FIG. 24, it is preferable that the third blade extends between outer blade members 622*b* but does not extend between inner blade members 622*a*. This is for the purpose of preventing the air-blowing force from being decreased because adjacent blades are excessively close to each other on the inner circumferential side of second plane 620*b*.

Sixth Embodiment

The present embodiment is different in configuration of the impeller, particularly in configurations of the main plate, the shroud and the second blade, from the fourth embodiment, but other configurations are the same as those in the fourth embodiment. Accordingly, the same description will not be repeated.

(Configuration)

The impeller of the present embodiment will be hereinafter described with reference to FIGS. 25 to 32. For ease of explanation in the following, in the present embodiment, the plane of shroud 623 that faces main plate 620 is defined as the first back surface; the plane of shroud 623 on the side opposite to the first back surface is defined as the first front surface; the plane of main plate 620 that faces shroud 623 (the plane to which the first blade is welded; first plane 620a) is defined as the second front surface; and the plane of main plate 620 from which the second blade protrudes (second plane 620b) is defined as the second back surface. Also in the present embodiment, first member 62A and second member 62B are integrally molded by a resin containing a fibrous filler, and impeller 62 formed of first member 62A and second member 62B is configured by welding these members.

In plan view as seen from the direction orthogonal to the imaginary plane extending across the outer circumferential end of first back surface 623B, shroud 623 has an annular shape. As seen in a cross section orthogonal to the imaginary plane extending across the outer circumferential end of first back surface 623B, shroud 623 has a truncated cone shape having a slope portion squeezed to a certain extent.

Figure 28:
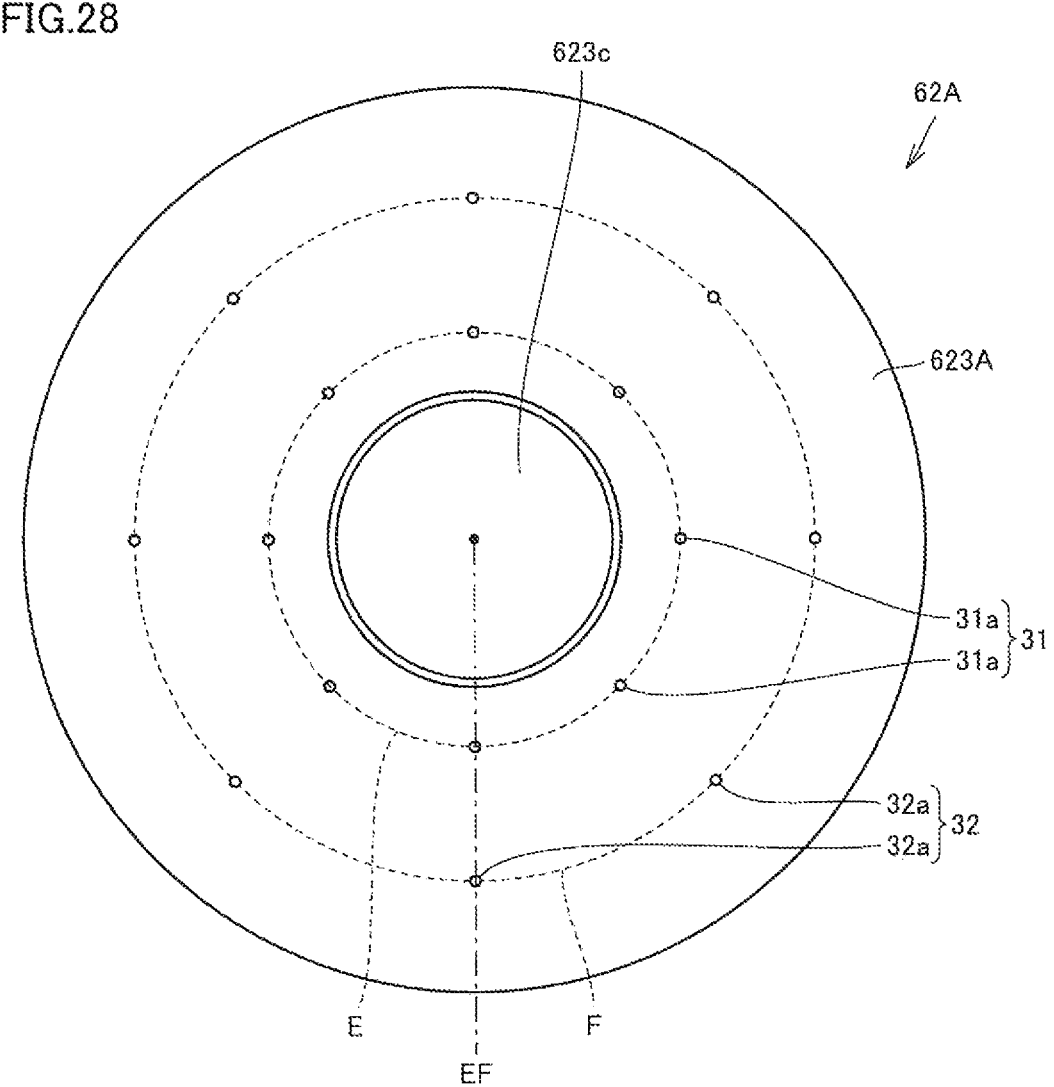
FIG. 28 is a front view schematically showing the configuration of the first member in the sixth embodiment.
Figure 29:
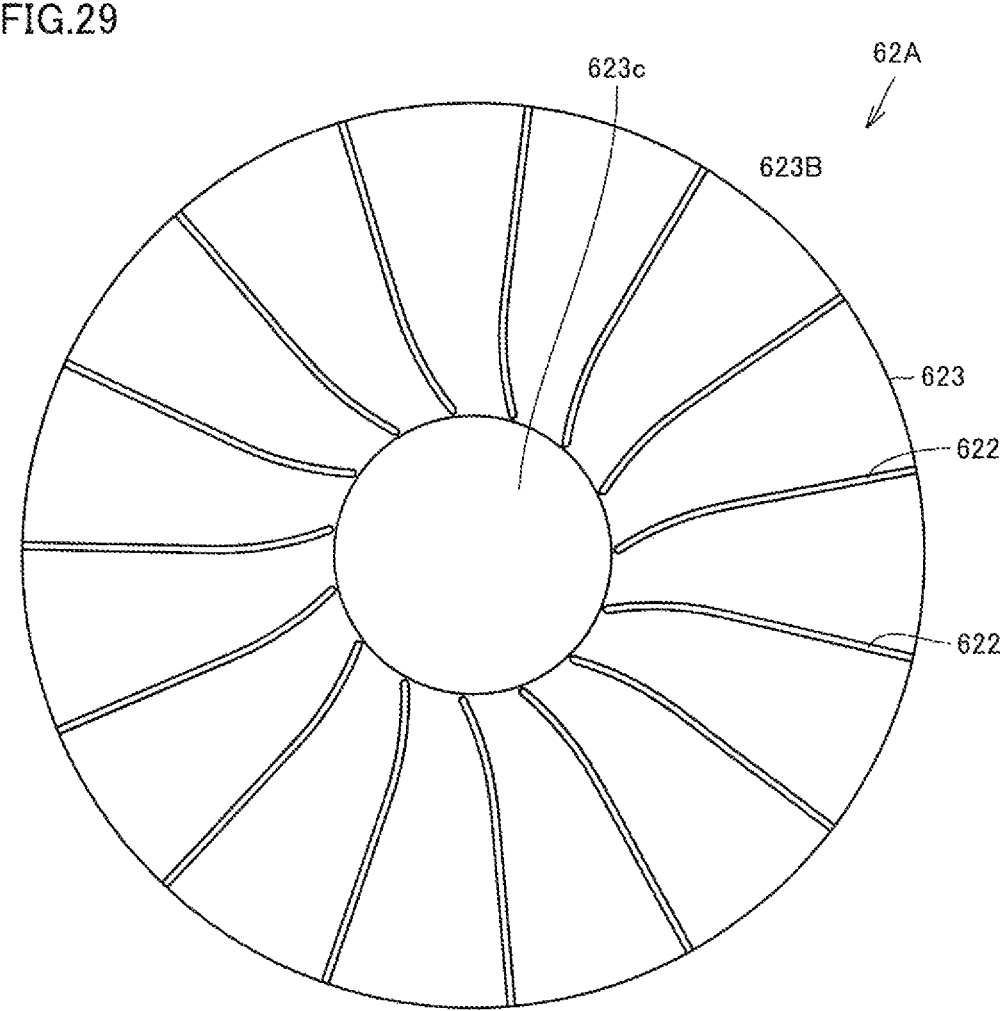
FIG. 29 is a front view schematically showing the configuration of the first blade in the first member in the sixth embodiment.
Figure 30:
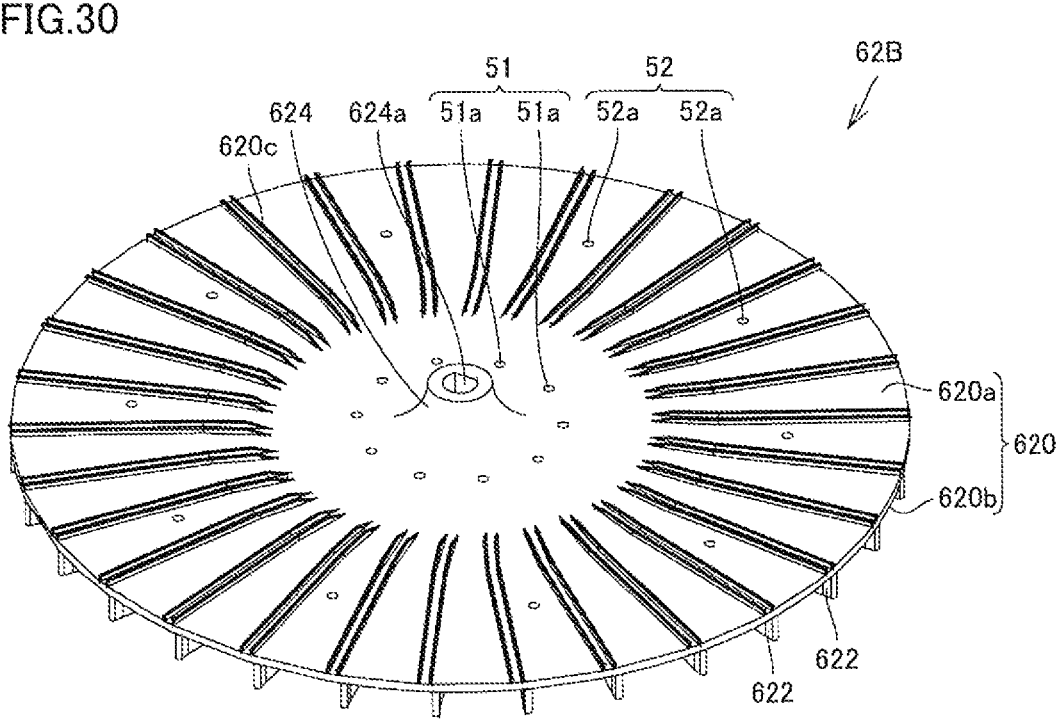
FIG. 30 is a perspective view schematically showing the configuration of the second member of the impeller in the sixth embodiment.

Referring mainly to FIG. 28, first front surface 623A of shroud 623 on the side opposite to first back surface 623B is provided with an inner circumferential side gate mark portion 31 located on an imaginary circumference E on the inner circumferential side; and an outer circumferential side gate mark portion 32 located on an imaginary circumference F close to the outer circumferential side relative to inner circumferential side gate mark portion 31.

Inner circumferential side gate mark portion 31 has a plurality of inner circumferential side gate marks 31a, which are located at regular intervals, for example, on circumference E. Furthermore, outer circumferential side gate mark portion 32 has a plurality of outer circumferential side gate marks 32a, which are located at regular intervals, for example, on circumference F.

In the present embodiment, the plurality of inner circumferential side gate marks 31a may be located on a base 31ab. This is because inner circumferential side gate marks 31a each are located in a curved portion of shroud 623 (see FIG. 26). Specifically, when first member 62A is molded by integral molding which will be described later, in the case where the inner circumferential side gate is provided at the position corresponding to the curved portion of shroud 623, a space for base 31ab is provided between the inner circumferential side gate and the space for shroud 623, thereby allowing a resin to be stably injected from the inner circumferential side gate.

In the present embodiment, inner circumferential side gate marks 31a and outer circumferential side gate marks 32a are equal in number. Furthermore, a corresponding one of inner circumferential side gate marks 31a and a corresponding one of outer circumferential side gate marks 32a are located on the same straight line EF extending in the radial direction on first front surface 623A. FIG. 28 shows that one inner circumferential side gate mark 31a and one outer circumferential side gate mark 32a are located on the same straight line EF, which also applies to the case of other gate marks. In other words, one inner circumferential side gate mark 31a is located on the imaginary straight line connecting the center of opening 623c provided in shroud 623 (the position shown by a black spot in FIG. 28) and one outer circumferential side gate mark 32a.

Figure 32:
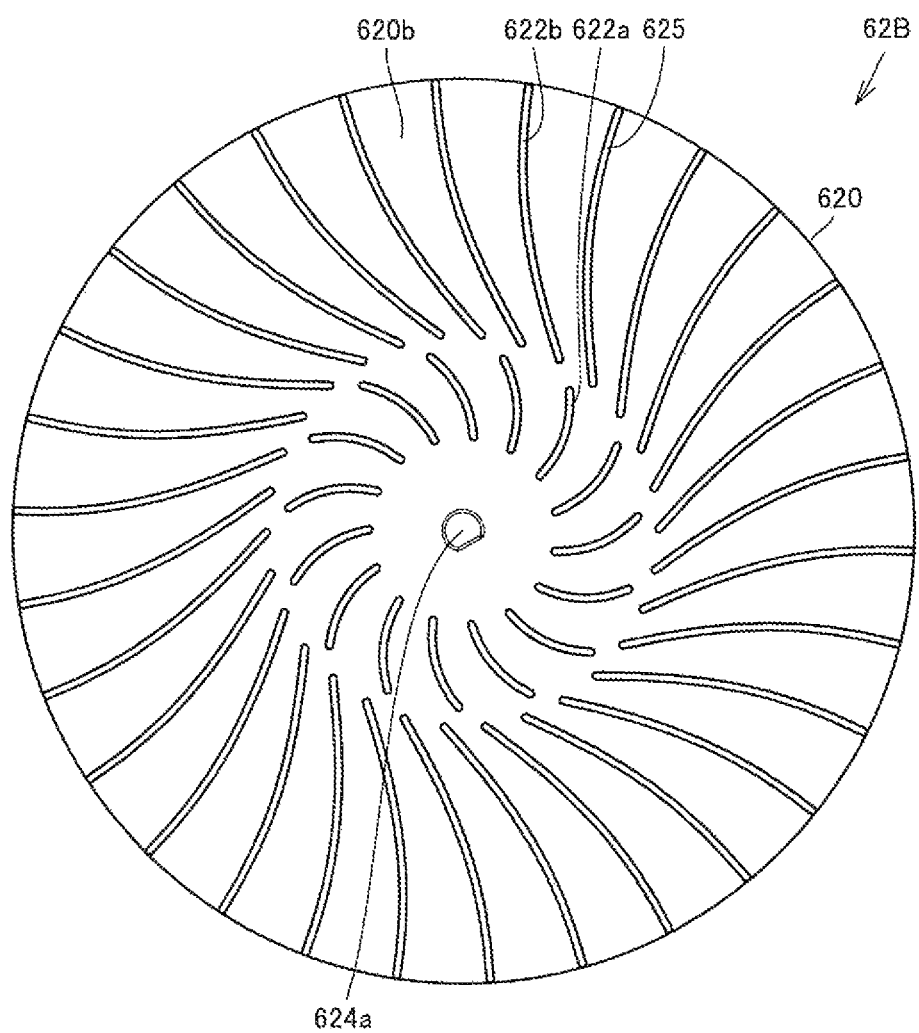
FIG. 32 is a front view schematically showing the configuration of the second blade in the second member in the sixth embodiment.
Figure 33:
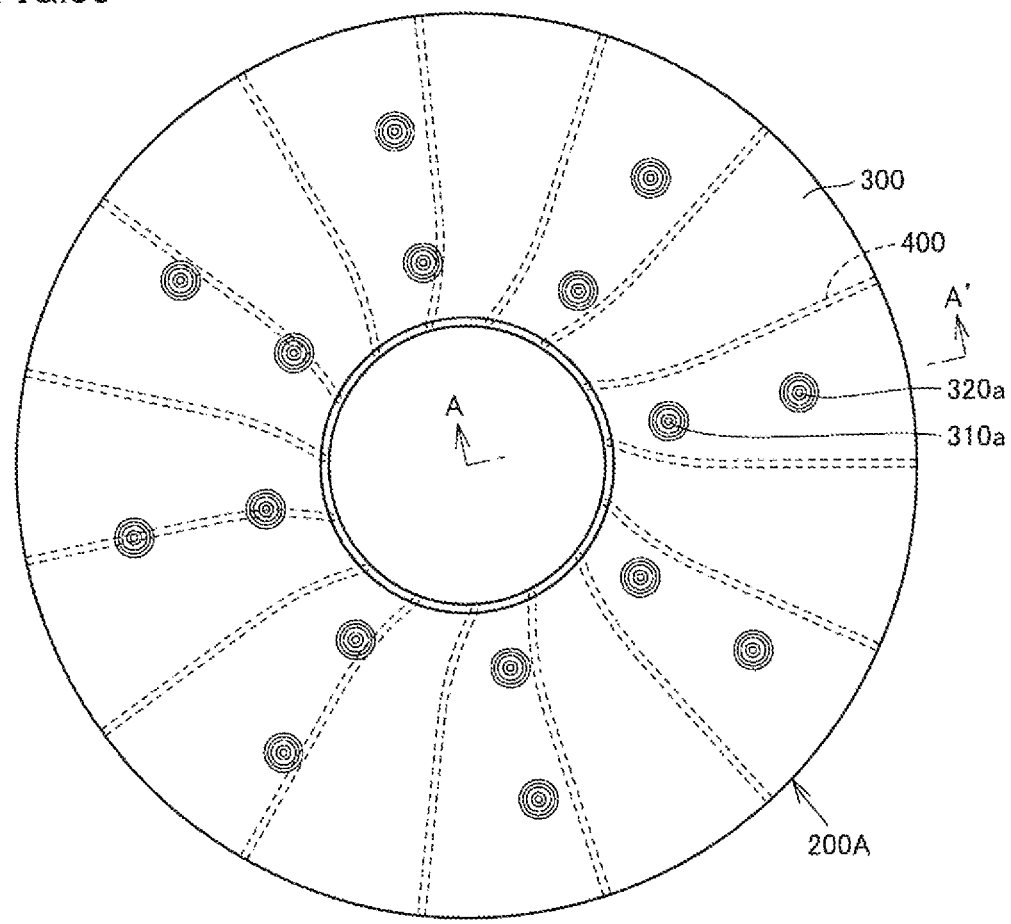
FIG. 33 is a schematic diagram for illustrating the relation between a space within a molding die for molding the first member and the position of a gate.

Referring mainly to FIG. 32, second blade 622 is separated by a slit into outer blade member 622b located on the outer circumferential side of second back surface 620b and inner blade member 622a located close to the inner circumferential side relative to outer blade member 622b. Outer blade member 622b is greater in radius of curvature than inner blade member 622a, and outer blade member 622b and inner blade member 622a are curved in different directions, thereby forming an S-shape as a whole. Furthermore, an intermediate blade member (the third blade) 625 extending from the inner circumferential side toward the outer circumferential side of second back surface 620b is provided between outer blade members 622b adjacent to each other. In other words, the shape of second blade 622 of the present embodiment is similar to the shape of the second blade shown in FIG. 24 (another configuration in the fifth embodiment).

Figure 31:
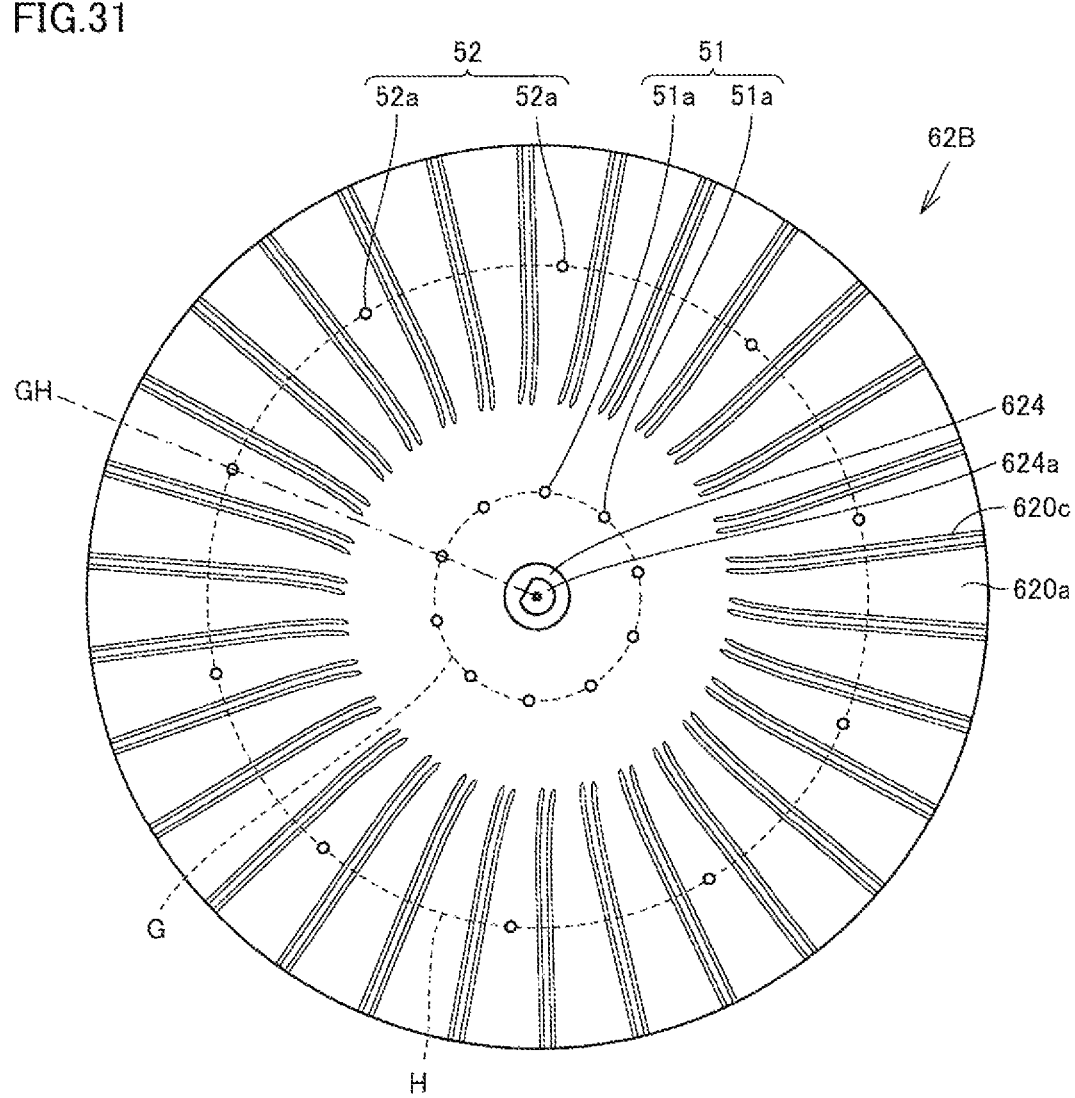
FIG. 31 is a front view schematically showing the configuration of the second member in the sixth embodiment.

Referring mainly to FIG. 31, second front surface 620a of main plate 620 is provided with an inner circumferential side gate mark portion 51 located on an imaginary circumference G on the inner circumferential side; and an outer circumferential side gate mark portion 52 located on an imaginary circumference H close to the outer circumferential side relative to inner circumferential side gate mark portion 51.

Inner circumferential side gate mark portion 51 has a plurality of inner circumferential side gate marks 51a, which are located at regular intervals, for example, on circumference G. Furthermore, outer circumferential side gate mark portion 52 has a plurality of outer circumferential side gate marks 52a, which are located at regular intervals, for example, on circumference H.

In the present embodiment, inner circumferential side gate marks 51a and outer circumferential side gate marks 52a are equal in number. Furthermore, a corresponding one of inner circumferential side gate marks 51a and a corresponding one of outer circumferential side gate marks 52a are located on the same straight line GH extending in the radial direction on second front surface 620a. FIG. 31 shows that one inner circumferential side gate mark 51a and one outer circumferential side gate mark 52a are located on the same straight line GH, which also applies to the case of other gate marks. In other words, one inner circumferential side gate mark 51a is located on the imaginary straight line connecting the center of main plate 620 (the position shown by a black spot in FIG. 31) and one outer circumferential side gate mark 52a.

(Production of Impeller)

One example of the method of producing impeller 62 of the present embodiment will be hereinafter described with reference to FIGS. 33 to 37. First member 62A as one of the components of impeller 62 can be integrally molded as in the following manner Referring mainly to FIG. 33, first prepared is a molding die having an internal space 200A including: a first internal space 300 (corresponding to the shape of shroud 623); and a plurality of second internal spaces 400 protruding from first internal space 300 (corresponding to the shape of first blade 622). Internal space 200A (a space including first internal space 300 and second internal space 400) of this molding die has a shape corresponding to the shape of first member 62A to be molded.

The above-described molding die is further provided with a gate through which a resin is injected into the space corresponding to the shape of first member 62A. Specifically, a plurality of gates are provided so as to allow each end of the plurality of inner circumferential side gates 310a and the plurality of outer circumferential side gates 320a to communicate with a portion corresponding to first front surface 623A of shroud 623. In addition, as shown in FIG. 34, inner circumferential side gates 310a and outer circumferential side gates 320a each are formed as a pin gate.

Inner circumferential side gates 310a are located at regular intervals on the circumference on the inner circumferential side of first internal space 300 while outer circumferential side gates 320a are located at regular intervals on the circumference close to the outer circumferential side relative to inner circumferential side gates 310a. Furthermore, one inner circumferential side gate 310a and one outer circumferential side gate 320a are located on the same radial line of first internal space 300. Also, inner circumferential side gates 310a and outer circumferential side gates 320a are equal in number.

Figure 34:
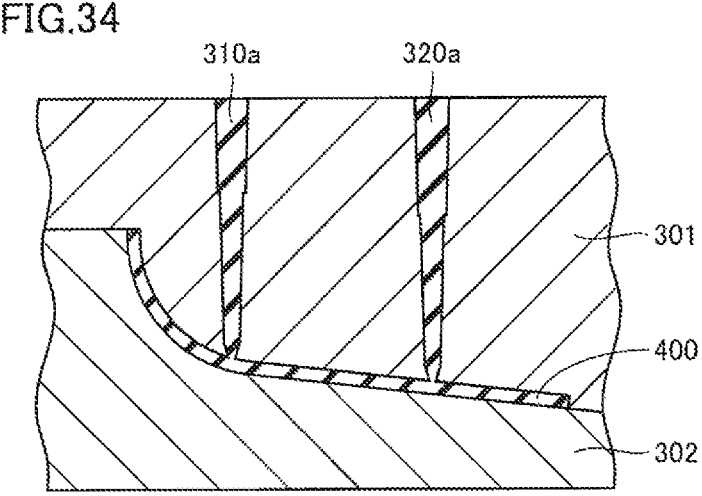
FIG. 34 is a schematic cross-sectional view taken along a line A-A' in FIG. 33 showing the state where a resin is injected into the space within the molding die and into the gate.

Referring mainly to FIG. 34, a resin containing a fibrous filler is injected into internal space 200A through inner circumferential side gate 310a and outer circumferential side gate 320a in molding dies 301 and 302 in which internal space 200A described above and a gate are provided. Accordingly, internal space 200A of molding dies 301 and 302 is filled with a resin.

After internal space 200A and the gate in molding dies 301 and 302 are filled with a resin, the resin is cured, and then, molding dies 301 and 302 are removed, thereby separating the resin filling inner circumferential side gate 310a and outer circumferential side gate 320a and the resin filling the internal space. This results in integrally-molded first member 62A that is molded in a shape of internal space 200A of the molding die and has a gate mark left at a position corresponding to the position of each end of inner circumferential side gate 310a and outer circumferential side gate 320a.

Second member 62B as the other component of impeller 62 can also be integrally molded by the method similar to that for first member 62A.

Figure 35:
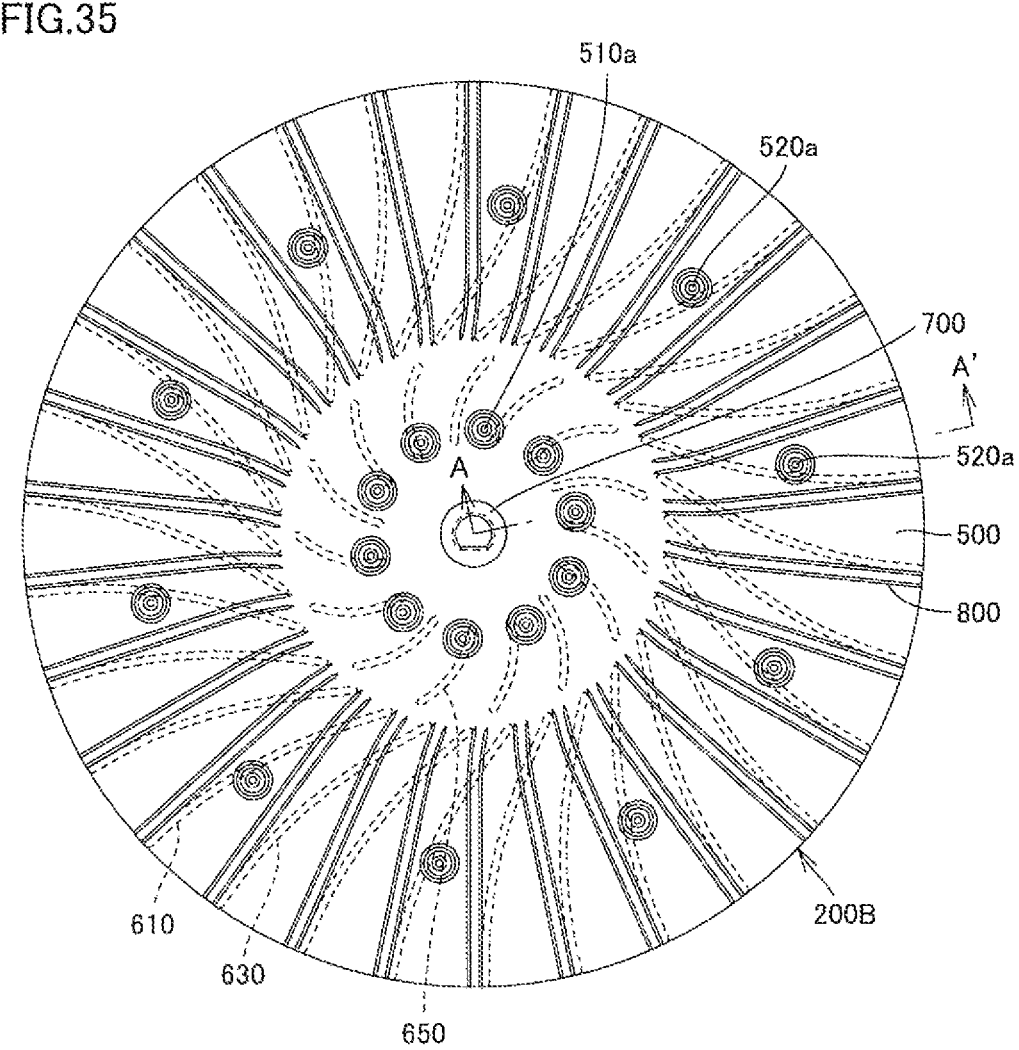
FIG. 35 is a schematic diagram for illustrating the relation between the space within the molding die for molding the second member and the position of the gate.
Figure 36:
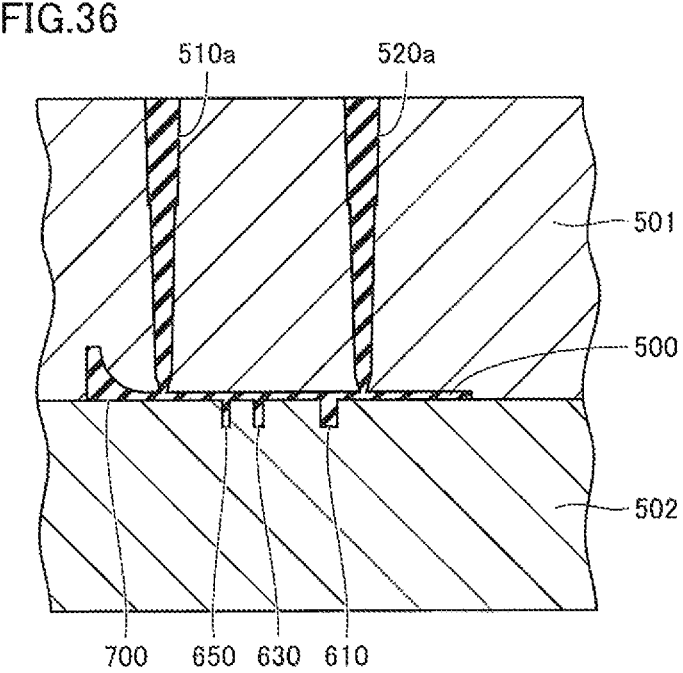
FIG. 36 is a schematic cross-sectional view taken along a line A-A' in FIG. 35 showing the state where a resin is injected into the space within the molding die and into the gate.

Specifically, referring to FIGS. 35 and 36, first prepared is a molding die having an internal space 200B that includes: a third internal space 500 (corresponding to the shape of main plate 620); a plurality of fourth internal spaces 610, 650 and 630 (corresponding to the shapes of outer blade member 622b, inner blade member 622a and intermediate blade member 625, respectively) protruding from third internal space 500; and a fifth internal space 700 (corresponding to the shape of boss portion 624). Internal space 200B (the space including third internal space 500, fourth internal spaces 610, 650, 630, and fifth internal space 700) of this molding die has a shape corresponding to the shape of second member 62B to be molded. In addition, third internal space 500 is provided on its upper surface side with a groove space 800 used for holding end 621c of first blade 621 therein.

The above-described molding die is further provided with a gate through which a resin is injected into the space corresponding to the shape of second member 62B. Specifically, a plurality of gates are provided so as to allow each end of the plurality of inner circumferential side gates 510a and the plurality of outer circumferential side gates 520a to communicate with a portion corresponding to second front surface 620a of main plate 620. In addition, as shown in FIG. 36, inner circumferential side gates 510a and outer circumferential side gates 520a each are formed as a pin gate.

Inner circumferential side gates 510a are located at regular intervals on the circumference on the inner circumferential side of third internal space 500 while outer circumferential side gates 520a are located at regular intervals on the circumference close to the outer circumferential side relative to inner circumferential side gates 510a. Furthermore, one inner circumferential side gate 510a and one outer circumferential side gate 520a are located on the same radial line of third internal space 500. Also, inner circumferential side gates 510a and outer circumferential side gates 520a are equal in number.

Referring mainly to FIG. 35, a resin containing a fibrous filler is injected into internal space 200B through inner circumferential side gate 510a and outer circumferential side gate 520a in molding dies 501 and 502 in which internal space 200B described above and a gate are provided. Accordingly, internal space 200B of molding dies 501 and 502 is filled with a resin.

After internal space 200B and the gate in molding dies 501 and 502 are filled with a resin, the resin is cured, and then, molding dies 501 and 502 are removed, thereby separating the resin filling inner circumferential side gate 510a and outer circumferential side gate 520a and the resin filling the internal space. This results in integrally-molded second member 62B that is molded in a shape of the internal space of the molding die and has a gate mark left at a position corresponding to the position of each end of inner circumferential side gate 510a and outer circumferential side gate 520a.

Then, first member 62A and second member 62B that are integrally molded are coupled to each other. It is preferable to employ the above-described ultrasonic welding for this coupling.

(Functions and Effects)

The functions and effects of impeller 62 according to the present embodiment will be hereinafter described.

As to a resin member integrally molded using a molding die, a resin tends to shrink at the time of curing. Particularly when producing a component like a disc having a shape increased in area in the circumferential direction, the resin tends to shrink more in the radial direction. Accordingly, in order to improve the uniformity of the shape of the component after curing, the resin injected into the molding die is required to evenly shrink in the radial direction.

Conventionally, when a resin product having a disc-shaped component is molded, a resin flows while spreading from the inner circumferential side toward the outer circumferential side, so that the uniformity of the shape can be improved. This is the reason why a molding die provided with a gate at a portion corresponding to the inner circumferential side of a disc-shaped component (a portion close to the center) has been used. The resin member integrally molded by this method is to have a gate mark located on the inner circumferential side of the disc.

It has been however found that the uniformity of the shape of main plate 620 is greatly deteriorated in the case where second member 62B is integrally molded using a molding die in accordance with the above-described conventional method, that is, in the case where second member 62B is integrally molded using a molding die having an internal space corresponding to second member 62B and provided with inner circumferential side gate 510a in the internal space on the inner circumferential side of third internal space 500 that is increased in area in the circumferential direction, the reason of which will be described as set forth below.

The filler in the resin injected into disc-shaped third internal space 500 (corresponding to the shape of main plate 620) is more likely to spread due to the shape of this space. In contrast, the filler in the resin injected into each of fourth internal spaces 610, 650 and 630 (corresponding to the shapes of outer blade member 622b, inner blade member 622a and intermediate blade member 625, respectively) is more likely to be oriented in the extending direction of each of fourth internal spaces 610, 650 and 630 due to the shapes of these spaces. This is because third internal space 500 has a shape that allows the resin to flow in various directions, whereas fourth internal spaces 610, 650 and 630 each have a shape that causes the resin to flow only in a certain direction (the direction in which each internal space extends).

By causing the resin to flow only in a certain direction in each of fourth internal spaces 610, 650 and 630, a filler is to be oriented with high orientation property (alignment property) in each of fourth internal spaces 610, 650 and 630. Such orientation of the filler acts to strongly resist radial shrinkage of the resin in third internal space 500. This resistance causes a difference in the amount of shrinkage of main plate 620 in the radial direction of main plate 620 between a region where second blade 622 is formed and a region where second blade 622 is not formed. This leads to uneven shrinkage of the resin in the radial direction at the time of molding of main plate 620, with the result that the uniformity of the shape of main plate 620 is decreased.

If the uniformity of the shape of main plate 620 is decreased, fixation of first member 62A and second member 62B using a jig becomes unstable at the time of ultrasonic welding. The same also applies to the case where the uniformity of the shape of annular shroud 623 is relatively poor.

In contrast, in impeller 62 of the present embodiment, second front surface 620a of main plate 620 has: an inner circumferential side gate mark 51a located on circumference G on the inner circumferential side; and an outer circumferential side gate mark 52a located on circumference H close to the outer circumferential side relative to inner circumferential side gate mark 51a. In other words, the impeller of the present embodiment is molded by injecting a resin containing a fibrous filler from each of inner circumferential side gate 510a and outer circumferential side gate 520a using a molding die having inner circumferential side gate 510a provided on the circumference on the inner circumferential side of disc-shaped third internal space 500 and outer circumferential side gate 520a located on the circumference close to the outer circumferential side relative to inner circumferential side gate 510a.

When a resin is injected from inner circumferential side gate 510a located on the circumference on the inner circumferential side of third internal space 500 and from outer circumferential side gate 520a located on the circumference close to the outer circumferential side relative to inner circumferential side gate 510a, the flow of the resin moving from outer circumferential side gate 520a into the space of the molding die exerts an influence upon the flow of the resin moving from inner circumferential side gate 510a into the space of the molding die. This causes a disturbance in the flow of the resin flowing from inner circumferential side gate 510a into the space of the molding die. Accordingly, the orientation of the filler in each of fourth internal spaces 610, 650 and 630 can be suppressed as compared with the case where a resin is injected only from inner circumferential side gate 510a, so that resistance by the filler oriented in second blade 622 to be formed can be reduced.

Therefore, for the reasons described above, uneven shrinkage of main plate 620 in the radial direction caused by existence of second blade 622 can be suppressed. Consequently, since the uniformity of the shape of main plate 620 can be improved, first member 62A and second member 62B that includes main plate 620 and second blade 622 can be sufficiently welded, so that excellent durability and strength can be achieved while stable air-blowing performance can be exhibited.

In main plate 620 of the impeller as described above, inner circumferential side gate mark portion 51 has a plurality of inner circumferential side gate marks 51a while outer circumferential side gate mark portion 52 has a plurality of outer circumferential side gate marks 52a. In this case, since a resin can be injected in from the plurality of inner circumferential side gates 510a and the plurality of outer circumferential side gates 520a at the time of molding, the uniformity of the shape of second member 62B is further improved.

Furthermore, in the present embodiment, inner circumferential side gate marks 51a are located at regular intervals on a corresponding circumference while outer circumferential side gate marks 52a are located at regular intervals on a corresponding circumference. In this case, since the resin can be spread evenly in the circumferential direction at the time of molding, the uniformity of the shape of second member 62B is further improved.

Furthermore, in the present embodiment, a corresponding one of inner circumferential side gate marks 51a and a corresponding one of outer circumferential side gate marks 52a are located on the same straight line extending in the radial direction on the same plane. Consequently, the flow of the resin coming from outer circumferential side gate 520a exerts a great influence upon the flow of the resin coming from inner circumferential side gate 510a at the time of molding of second member 62B. This causes a great disturbance in the flow of the resin coming from inner circumferential side gate 510a into the space of the molding die. Therefore, orientation of the filler in second blade 622 can be further suppressed, so that uneven shrinkage of main plate 620 in the radial direction caused by existence of second blade 622 can be further suppressed.

Furthermore, in the impeller of the present embodiment, first front surface 623A of shroud 623 has: an inner circumferential side gate mark 31a located on circumference E on the inner circumferential side; and an outer circumferential side gate mark 32a located on circumference F close to the outer circumferential side relative to inner circumferential side gate mark 31a. In other words, the impeller of the present embodiment is molded by injecting a resin containing a fibrous filler from each of inner circumferential side gate 310a and outer circumferential side gate 320a using a molding die having inner circumferential side gate 310a provided on the circumference on the inner circumferential side of annular first internal space 300 and outer circumferential side gate 320a located on the circumference close to the outer circumferential side relative to inner circumferential side gate 310a.

When a resin is injected in from inner circumferential side gate 310a located on the circumference on the inner circumferential side of first internal space 300 and from outer circumferential side gate 320a located on the circumference close to the outer circumferential side relative to inner circumferential side gate 310a, the flow of the resin coming from outer circumferential side gate 320a into the space of the molding die exerts an influence upon the flow of the resin coming from inner circumferential side gate 310a into the space of the molding die. This causes a disturbance in the flow of the resin flowing from inner circumferential side gate 310a into the space of the molding die. Accordingly, the orientation of the filler in second internal space 400 can be suppressed as compared with the case where a resin is injected in only from inner circumferential side gate 310a, so that the resistance by the filler oriented in first blade 621 to be formed can be reduced.

Therefore, for the reasons as described above, uneven shrinkage of shroud 623 in the radial direction caused by existence of first blade 621 can be suppressed. Consequently, since the uniformity of the shape of shroud 623 can be improved, second member 62B and first member 62A that includes shroud 623 and first blade 621 can be sufficiently welded. Accordingly, excellent durability and strength can be achieved while stable air-blowing performance can be exhibited.

In shroud 623 of the impeller as described above, inner circumferential side gate mark portion 31 has a plurality of inner circumferential side gate marks 31a while outer circumferential side gate mark portion 32 has a plurality of outer circumferential side gate marks 32a. In this case, since a resin can be injected in from the plurality of inner circumferential side gates 310a and the plurality of outer circumferential side gates 320a at the time of molding, the uniformity of the shape of first member 62A is further improved.

Furthermore, in the present embodiment, inner circumferential side gate marks 31a are located at regular intervals on a corresponding circumference while outer circumferential side gate marks 32a are located at regular intervals on a corresponding circumference. In this case, since the resin can be spread evenly in the circumferential direction at the time of molding, the homogeneity of first member 62A is improved.

Furthermore, in the present embodiment, a corresponding one of inner circumferential side gate marks 31a and a corresponding one of outer circumferential side gate marks 32a are located on the same straight line extending in the radial direction on the same plane. Consequently, the flow of the resin coming from outer circumferential side gate 320a exerts a great influence upon the flow of the resin coming from inner circumferential side gate 310a at the time of molding of first member 62A. This causes a greater disturbance in the flow of the resin coming from inner circumferential side gate 310a into the space of the molding die. Therefore, the orientation of the filler in first blade 621 can be further suppressed, so that uneven shrinkage of shroud 30 in the radial direction caused by existence of first blade 621 can be suppressed.

Seventh Embodiment

The seventh embodiment will be hereinafter described with reference to FIGS. 37 to 39. The present embodiment is different in configuration of the second member of the impeller from the sixth embodiment, and other configurations are the same as those in the sixth embodiment. Accordingly, the same description as that in the sixth embodiment will not be repeated.

(Configuration)

Figure 37:
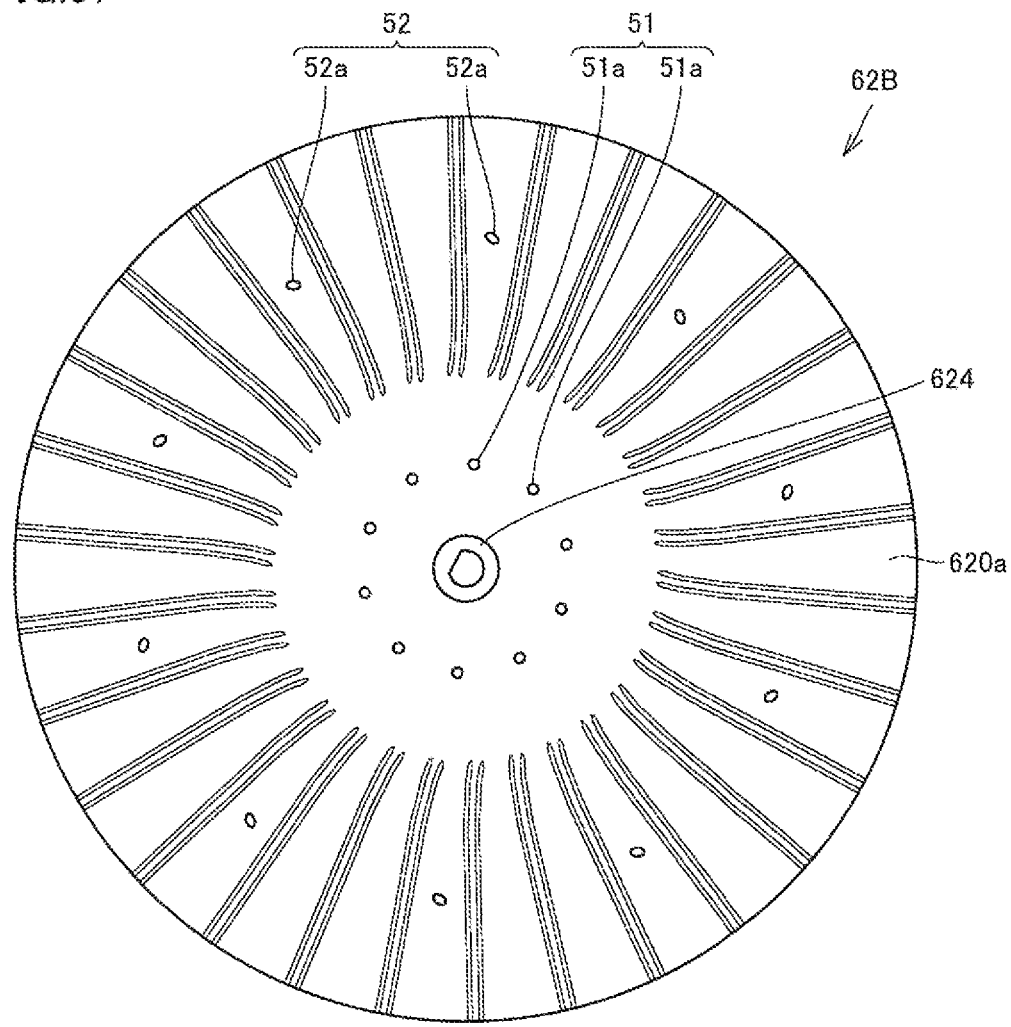
FIG. 37 is a front view schematically showing the configuration of the second member in which an outer circumferential side gate mark has an elliptical shape.

Referring mainly to FIG. 37, second member 62B is different from that in the sixth embodiment in the point that outer circumferential side gate marks 52a forming outer circumferential side gate mark portion 52 each have an elliptical shape. It is to be noted that inner circumferential side gate marks 51a and outer circumferential side gate marks 52a in the sixth embodiment each have a circular shape. This second member 62B can be integrally molded as described below.

(Method of Molding Second Member)

Figure 38:
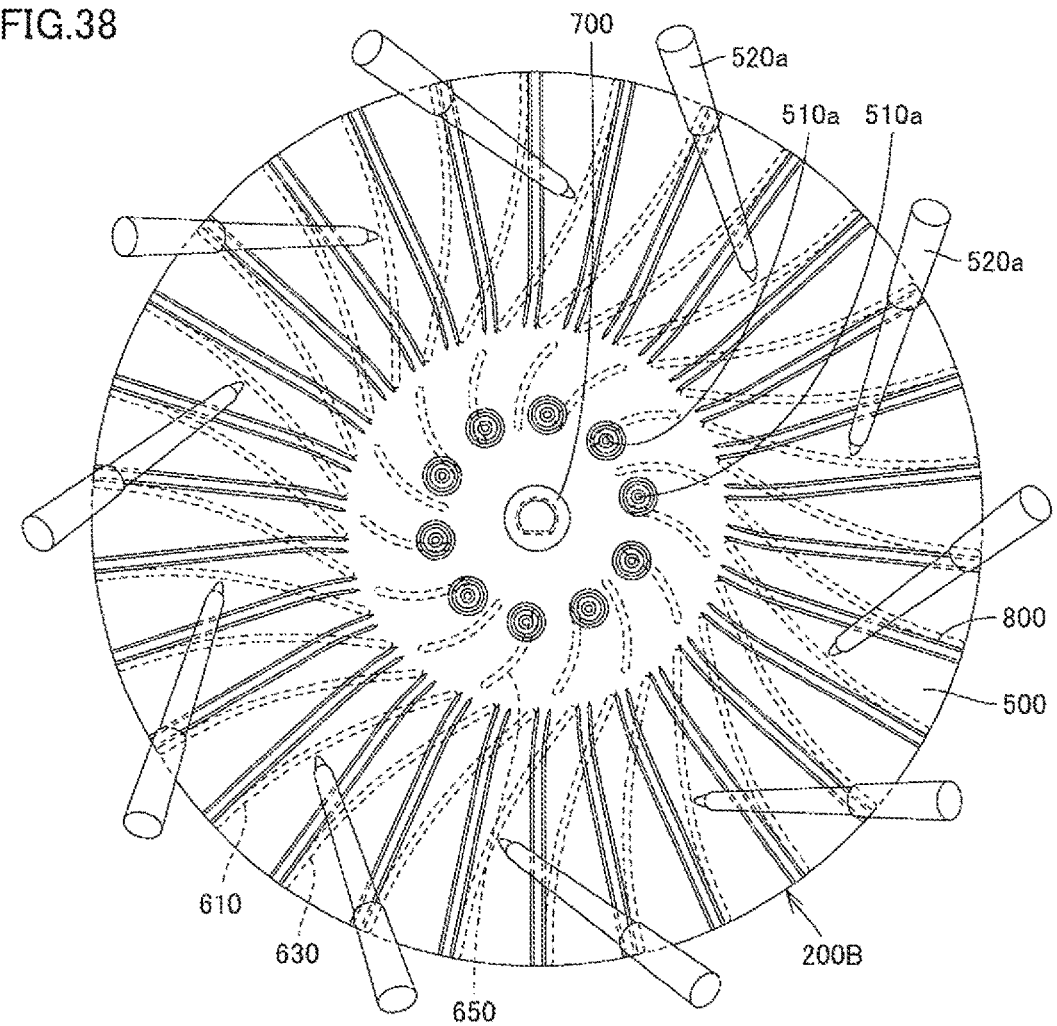
FIG. 38 is a schematic diagram for illustrating the relation between the space within the molding die for molding the second member shown in FIG. 37 and the position of the gate.
Figure 39:
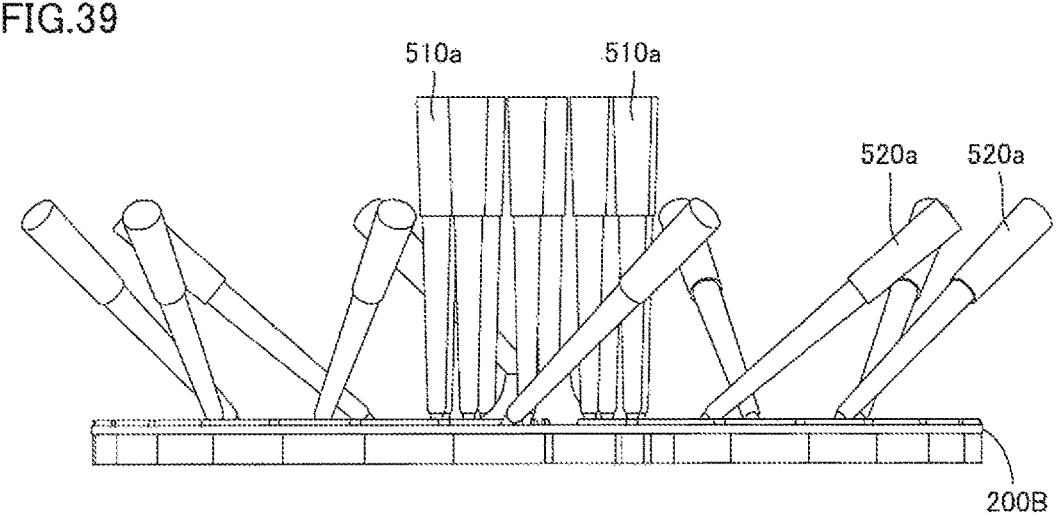
FIG. 39 is a schematic diagram showing the state shown in FIG. 38 as seen from a different direction.

Referring mainly to FIGS. 38 and 39, first prepared is a molding die having an internal space 200B including: third internal space 500 (corresponding to the shape of main plate 620); a plurality of fourth internal spaces 610, 650 and 630 (corresponding to the shapes of outer blade member 622b, inner blade member 622a and intermediate blade member 625, respectively) protruding from third internal space 500; and fifth internal space 700 (corresponding to the shape of boss portion 624). Internal space 200B (the space including third internal space 500, fourth internal spaces 610, 650 and 630, and fifth internal space 700) of this molding die is the same as that in the sixth embodiment because it has a shape corresponding to the shape of second member 62B to be molded.

The above-described molding die is further provided with a gate through which a resin is injected into a space having a shape corresponding to the shape of second member 62B.

In this case, the seventh embodiment is different from the sixth embodiment in the angle of outer circumferential side gate 520a to the portion corresponding to second front surface 620a of main plate 620. Specifically, in the sixth embodiment, the ends of inner circumferential side gate 510a and outer circumferential side gate 520a come in contact approximately perpendicularly with the portion corresponding to second front surface 620a of main plate 620. On the other hand, in the present embodiment, outer circumferential side gate 520a comes in contact with the portion corresponding to second front surface 620a of main plate 620 at a slanting angle. This is for the purpose of causing the resin injected from outer circumferential side gate 520a to flow in the circumferential direction in third internal space 500.

Accordingly, outer circumferential side gate 520a is designed so as to be arranged at a slanting angle to the plane corresponding to second front surface 620a (approximately 45° in FIG. 39) and arranged at a slanting angle also to the circumferential direction of second front surface 620a (approximately 45° in FIG. 38). In this case, the expression that outer circumferential side gate 520a is "arranged at a slanting angle to the plane corresponding to second front surface 620a" means that outer circumferential side gate 520a is provided so as to come in contact with the internal space of second member 62B at a slanting angle when the internal space of second member 62B is seen from the direction in which third internal space 500 extends (the circumferential direction) (FIG. 39). Furthermore, the expression that outer circumferential side gate 520a is "arranged at a slanting angle to the circumferential direction of second front surface 620a" means that outer circumferential side gate 520a is provided so as to come in contact with the space of second member 62B at a slanting angle when the plane corresponding to second front surface 620a of second member 62B is seen in top down view (FIG. 38).

Accordingly, when a resin containing a fibrous filler is injected from outer circumferential side gate 520a, this resin can flow preferentially in the circumferential direction on the outer circumferential side of the internal space of the molding die as compared with the case in the sixth embodiment. Therefore, the filler in the resin injected from outer circumferential side gate 520a can be remarkably suppressed from being oriented in fourth internal spaces 610, 650 and 630. Furthermore, the filler in the resin injected from inner circumferential side gate 510a can be more remarkably suppressed from being oriented on the outer circumferential side of fourth internal spaces 610, 650 and 630. Since the details of the molding method other than the above are the same as those in the sixth embodiment, description thereof will not be repeated.

(Functions and Effects)

Due to its shape, radial shrinkage of third internal space 500 tends to be greater on the outer circumferential side than on the inner circumferential side. In contrast, in the impeller of the present embodiment, resistance by the filler is more remarkably suppressed on the outer circumferential side of second member 62B, so that uneven shrinkage of main plate 620 in the radial direction caused by existence of second blade 622 can be remarkably suppressed.

Accordingly, the uniformity of the shape of main plate 620 can be further improved, thereby allowing sufficient welding between first member 62A and second member 62B that includes main plate 620 and second blade 622. Therefore, excellent durability and strength can be achieved while stable air-blowing performance can be exhibited.

Although second member 62B has been described in the present embodiment, the same also applies to first member 62A. Specifically, when first member 62A is integrally molded, it may be possible to use a molding die that is designed so as to cause outer circumferential side gate 320a to come in contact with the internal space of first member 62A at a slanting angle. In this case, outer circumferential side gate mark 32a included in first member 62A has an elliptical shape.

Eighth Embodiment

The present embodiment is different in configuration of second member 62B of the impeller and in specific material of second member 62B from the sixth embodiment, and other configurations are the same as those in the sixth embodiment. Accordingly, the same description as that in the sixth embodiment will not be repeated.

(Configuration)

In the present embodiment, second member 620B is integrally molded using a resin containing a fibrous filler and a spherical filler. Specifically, second member 620B is integrally molded by injecting a resin containing a fibrous filler from the position corresponding to inner circumferential side gate mark 51a and by injecting a resin containing a spherical filler from the position corresponding to outer circumferential side gate mark 52a.

Accordingly, in second member 62B, a spherical filler is to be contained more on the outer circumferential side than on the inner circumferential side while a fibrous filler is to be contained more on the inner circumferential side than on the outer circumferential side.

(Functions and Effects)

As described above, due to its shape, radial shrinkage of third internal space 500 tends to be greater on the outer circumferential side than on the inner circumferential side. In contrast, in the impeller of the present embodiment, second member 62B is to contain more spherical filler and less fibrous filler on the outer circumferential side as compared with the sixth embodiment. Accordingly, since the resistance by a filler is more remarkably suppressed on the outer circumferential side of second member 62B, uneven shrinkage of main plate 620 in the radial direction by existence of second blade 622 can be remarkably suppressed.

Accordingly, the uniformity of the shape of main plate 620 can be further improved, thereby allowing sufficient welding between first member 62A and second member 62B that includes main plate 620 and second blade 622. Therefore, excellent durability and strength can be achieved while stable air-blowing performance can be exhibited.

Although second member 62B has been described in the present embodiment, the same also applies to first member 62A. Specifically, when first member 62A is to be integrally molded, a resin containing a fibrous filler may be injected from the position of inner circumferential side gate mark 31a and a resin containing a spherical filler may be injected from the position of outer circumferential side gate mark 32a. In this case, first member 62A is to contain a spherical filler more on the outer circumferential side than on the inner circumferential side and to contain a fibrous fillers more on the inner circumferential side than on the outer circumferential side. Consequently, the resistance by the filler on the outer circumferential side of first member 62A can be more remarkably suppressed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A fan comprising:
    an impeller including a main plate formed in a disc shape and having a first plane, a plurality of first blades each formed so as to extend from an inner circumferential side to an outer circumferential side of said first plane of said main plate and protrude from said first plane, and a shroud covering said plurality of first blades and formed integrally with said plurality of first blades;
    a fan case housing said impeller;
    a drive source attached to said fan case for driving said impeller; and
    a rotation shaft coupling said impeller and said drive source,
    said first blades each including a linearly protruding region that is linearly increased in height from the outer circumferential side to the inner circumferential side, and a curvedly protruding region that is curvedly increased in height from the outer circumferential side to the inner circumferential side, said height extending in a direction in which each said first blade protrudes from said first plane, and said curvedly protruding region being located closer to the inner circumferential side of said first plane than said linearly protruding region is,
    said linearly protruding region being welded to said main plate.

2. The fan according to claim 1, wherein said curvedly protruding region is defined as a non-weld region that is not welded to said main plate.

3. The fan according to claim 1, wherein
    said impeller further includes a plurality of second blades each formed so as to extend from an inner circumferential side to an outer circumferential side of a second plane of said main plate on a side opposite to said first plane and protrude from said second plane, and
    when said main plate is seen from an axial direction of said rotation shaft, each of said second blades is located between two said first blades adjacent to each other.

4. The fan according to claim 1, wherein when said main plate is seen from an axial direction of said rotation shaft, a portion including an outer circumferential end of each of said first blades is disposed in a radial direction of said main plate.

5. The fan according to claim 3, wherein when said main plate is seen from the axial direction of said rotation shaft, a portion including an outer circumferential end of each of said second blades is disposed in a radial direction of said main plate.

6. The fan according to claim 1, wherein
a plurality of positioning concave portions are provided in said first plane of said main plate, and
said plurality of first blades are inserted into and welded to said plurality of positioning concave portions, respectively.

7. The fan according to claim 1, wherein a positioning protrusion is formed at an end of said curvedly protruding region of each said first blade on a side opposite to said shroud, and said protrusion is fitted in a hole provided in said first plane of said main plate.

* * * * *